United States Patent
Huang

(10) Patent No.: US 10,947,667 B2
(45) Date of Patent: Mar. 16, 2021

(54) METHODS AND APPARATUSES FOR PROCESSING TEXTILE FIBERS, KETTLE AUTOMATIC OPERATION DEVICES, AND TEXTILE FIBER PRODUCTS

(71) Applicant: BESTEE MATERIAL (TSINGTAO) CO., LTD., Qingdao (CN)

(72) Inventor: Xiaohua Huang, Qingdao (CN)

(73) Assignee: BESTEE MATERIAL (TSINGTAO) CO., LTD., Qingdao (CN)

( * ) Notice: Subject to any disclaimer, the term of this patent is extended or adjusted under 35 U.S.C. 154(b) by 249 days.

(21) Appl. No.: 15/870,927

(22) Filed: Jan. 13, 2018

(65) Prior Publication Data

US 2018/0282944 A1 Oct. 4, 2018

(30) Foreign Application Priority Data

| Apr. 1, 2017 | (CN) | 2017 1 0213544 |
| Aug. 8, 2017 | (CN) | 2017 1 0668883 |
| Aug. 8, 2017 | (CN) | 2017 2 0980428 U |

(51) Int. Cl.

| D06P 1/94 | (2006.01) |
| D06B 23/14 | (2006.01) |
| D06B 23/20 | (2006.01) |
| D06B 19/00 | (2006.01) |
| D06M 23/10 | (2006.01) |
| D06M 16/00 | (2006.01) |
| C09B 61/00 | (2006.01) |
| D06B 9/02 | (2006.01) |
| D06P 1/34 | (2006.01) |
| D06P 3/22 | (2006.01) |
| D06P 3/56 | (2006.01) |
| D06P 3/68 | (2006.01) |

(52) U.S. Cl.
CPC ............... *D06P 1/94* (2013.01); *C09B 61/00* (2013.01); *D06B 9/02* (2013.01); *D06B 19/00* (2013.01); *D06B 23/14* (2013.01); *D06B 23/205* (2013.01); *D06M 16/00* (2013.01); *D06M 23/105* (2013.01); *D06P 1/34* (2013.01); *D06P 3/22* (2013.01); *D06P 3/56* (2013.01); *D06P 3/68* (2013.01)

(58) Field of Classification Search
CPC ...... D06P 1/34; D06P 1/94; D06P 3/22; D06P 3/56; D06P 3/68; D06B 23/14; D06B 23/205; D06B 19/00; D06M 23/105; D06M 16/00

See application file for complete search history.

(56) References Cited

U.S. PATENT DOCUMENTS

| 5,313,965 A | * | 5/1994 | Palen | ................. B01D 11/0203 134/61 |
| 2007/0101514 A1 | * | 5/2007 | Kaneko | ................... C09B 61/00 8/436 |
| 2015/0056255 A1 | * | 2/2015 | Ragot | ....................... A23F 5/36 424/401 |

FOREIGN PATENT DOCUMENTS

| CN | 001766194 | * | 5/2006 | ............ Y02P 70/641 |
| CN | 103741523 | * | 4/2014 | ............... D06B 9/02 |
| CN | 106544906 | * | 3/2017 | ............... D06P 1/62 |

* cited by examiner

Primary Examiner — Amina S Khan

(74) *Attorney, Agent, or Firm* — Anova Law Group, PLLC

(57) ABSTRACT

A method for processing textile fibers is provided. The method comprises: adding a plurality of raw materials for processing textile fibers into a plurality of kettles; preparing supercritical carbon dioxide; obtaining one or more natural plant dyes and one or more natural plant extracts from the plurality of raw materials, and dissolving the one or more natural plant dyes and the one or more natural plant extracts in the supercritical carbon dioxide; dyeing and functionally modifying the textile fibers simultaneously by using the supercritical carbon dioxide carrying a mixture of the one or more natural plant dyes and the one or more natural plant extracts; performing a post-process to recycle the supercritical carbon dioxide; and performing a cleaning process to clean the one or more natural plant dyes and one or more natural plant extracts.

10 Claims, 5 Drawing Sheets

METHODS AND APPARATUSES FOR PROCESSING TEXTILE FIBERS, KETTLE AUTOMATIC OPERATION DEVICES, AND TEXTILE FIBER PRODUCTS

CROSS REFERENCE TO RELATED APPLICATIONS

This application claims priority to Chinese Patent Application No. 201710213544.X, filed on Apr. 1, 2017, Chinese Patent Application No. 201710668883.7, filed on Aug. 8, 2017, Chinese Patent Application No. 201720980428.6, filed on Aug. 8, 2017, the entire contents of all of which are incorporated herein by reference.

TECHNICAL FIELD

The present disclosure relates to the field of textile fiber manufacturing technology and, more particularly, to methods and apparatuses for processing textile fibers, related kettle automatic operation devices, and related textile fiber products.

BACKGROUND

Natural fibers, as the important material sources of the textile industry, are textile fibers directly obtained from natural or artificial cultivation of plants and artificial breeding animals. At present, natural fibers are the most important raw materials of the textile industry.

The naturally existing natural fibers include cotton, linen, silk, and animal hair, etc. The molecular components of cotton and hemp are mainly cellulose. The molecular components of silk and hair are mainly proteins in the form of polyamide polymer.

Chemical fibers are manufactured fibers that have textile properties. The raw materials of the chemical fibers are natural polymer compounds or synthetic polymer compounds. A typical manufactural process of a chemical fiber includes preparation of spinning dope, spinning, and post-processing, etc.

Chemical fibers include man-made fibers and synthetic fibers. The man-made fibers include viscose fiber, nitrate fiber, acetate fiber, copper ammonium fiber, and artificial protein fiber. The viscose fiber includes ordinary viscose fiber and outstanding performance viscose fiber. The synthetic fibers are made of synthetic polymer compounds. The synthetic fibers include polyester fiber, polyamide fiber, polyacrylonitrile fiber, etc.

The extraction of natural plant dyes, the conventional dyeing and functional modification of natural fibers include a process of wet chemical reaction, which consumes a lot of water resources and chemicals, and produces a lot of waste water that is highly concentrated, highly COD colored, smell, and even toxic. Such waste water causes serious pollutions to surrounding waters and ecological environments. Further, the extraction step and dyeing step in the existing fiber processes require dedicated devices, and various kettles are manually operated. As such, a one-time input cost and the energy consuming are high, and the process efficiency is low.

Accordingly, methods and apparatuses for processing textile fibers, related kettle automatic operation devices, and related textile fiber products are desired to be provided.

SUMMARY

One aspect of present disclosure provides a method for processing textile fibers, comprising: adding a plurality of raw materials for processing textile fibers into a plurality of kettles; preparing supercritical carbon dioxide; obtaining one or more natural plant dyes and one or more natural plant extracts from the plurality of raw materials, and dissolving the one or more natural plant dyes and the one or more natural plant extracts in the supercritical carbon dioxide; dyeing and functionally modifying the textile fibers simultaneously by using the supercritical carbon dioxide carrying a mixture of the one or more natural plant dyes and the one or more natural plant extracts; performing a post-process to recycle the supercritical carbon dioxide; and performing a cleaning process to clean the one or more natural plant dyes and one or more natural plant extracts.

In some embodiments, adding the plurality of raw materials for processing textile fibers into the plurality of kettles includes: automatically opening, using a kettle automatic operation device, kettle covers of a natural plant dye extraction kettle, a natural plant dyes and extracts kettle, and a dyeing and functional modification kettle; adding textile fibers to be dyed and functionally modified into the dyeing and functional modification kettle; adding one or more natural plant extracts into the natural plant dyes and extracts kettle; adding one or more natural plants into the natural plant dye extraction kettle; and automatically closing, using the kettle automatic operation device, the kettle covers of the plant dye extraction kettle, the natural plant dyes and extracts kettle, and the dyeing and functional modification kettle.

In some embodiments, adding the plurality of raw materials for processing textile fibers into the plurality of kettles includes: automatically opening, using a kettle automatic operation device, kettle covers of a natural plant dye extraction kettle, a natural plant dyes and extracts kettle, and a dyeing and functional modification kettle; adding textile fibers to be dyed and functionally modified into the dyeing and functional modification kettle; adding one or more natural plant extracts and one or more natural plant dyes into the natural plant dyes and extracts kettle; and automatically closing, using the kettle automatic operation device, the kettle covers of the plant dye extraction kettle, the natural plant dyes and extracts kettle, and the dyeing and functional modification kettle.

In some embodiments, preparing supercritical carbon dioxide includes: injecting the liquid carbon dioxide stored in a carbon dioxide storage tank into a carbon dioxide high pressure pump; increasing the pressure of the liquid carbon dioxide in the carbon dioxide high pressure pump to about 30 Mpa-32 MPa; and heating the liquid carbon dioxide in the carbon dioxide high pressure pump to about 90° C.-120° C.

In some embodiments, obtaining one or more natural plant dyes and one or more natural plant extracts from the plurality of raw materials and dissolving the one or more natural plant dyes and the one or more natural plant extracts in the supercritical carbon dioxide includes: extracting one or more natural plant dyes of the one or more natural plants in the natural plant dye extraction kettle; dissolving the one or more natural plant extract in the supercritical carbon dioxide respectively in the natural plant dye extraction kettle; dissolving the one or more natural plant dyes in the supercritical carbon dioxide respectively in the natural plant dyes and extracts kettle; and mixing the supercritical carbon dioxide carrying the one or more natural plant dyes and the supercritical carbon dioxide carrying the one or more natural plant extracts in a mixing kettle.

In some embodiments, a time period for dyeing and functionally modifying the textile fibers simultaneously by using the supercritical carbon dioxide carrying a mixture of the one or more natural plant dyes and the one or more natural plant extracts is in a range from 90 minutes to 150 minutes.

In some embodiments, the post-process includes: separating the supercritical carbon dioxide from the one or more natural plant dyes and the one or more natural plant extracts by converting the supercritical carbon dioxide into gaseous carbon dioxide; and converting the gaseous carbon dioxide into liquid carbon dioxide.

In some embodiments, the cleaning process includes: injecting the liquid carbon dioxide from a carbon dioxide storage tank into a carbon dioxide high pressure pump; increasing a pressure and a temperature of the liquid carbon dioxide in the high-pressure pump; adding a solubilizing agent into a dyeing and functional modification kettle to dissolve the one or more natural plant dyes and the one or more natural plant extracts; and separating the liquid carbon dioxide from the one or more natural plant dyes and the one or more natural plant extracts.

In some embodiments, the textile fibers include at least one of natural cotton fiber, natural linen fiber, natural silk fiber, natural wool fiber, and polyester fiber; the one or more natural plant extracts include at least one of mint extract, wormwood extract, and grass coral extract; and the one or more natural plant dyes include at least one of rose dye, violet dye, safflower dye, and perilla dye.

In some embodiments, a mass ratio of the textile fibers and the one or more natural plants is in a range from about 20:1 to about 10:1; and a mass ratio of the textile fibers and the one or more natural plant extracts is in a range from about 20:1 to about 10:1.

In some embodiments, a mass ratio of the textile fibers and the one or more natural plant dyes is in a range from about 50:1 to about 20:1; and a mass ratio of the textile fibers and the one or more natural plant extracts is in a range from about 20:1 to about 10:1.

Another aspect of the present disclosure provides an apparatus for processing textile fibers, comprising: a natural plant dye extraction kettle for extracting one or more natural plant dyes from one or more natural plants; a natural plant dyes or extracts kettle for storing one or more natural plant dyes and one or more natural plant extracts; a supercritical carbon dioxide preparation device for preparing supercritical carbon dioxide; a mixing kettle for dissolving one or more natural plant dyes and one or more natural plant extracts in the supercritical carbon dioxide; a dyeing and functional modification kettle for dyeing and functionally modifying the textile fibers simultaneously by using the supercritical carbon dioxide carrying a mixture of the one or more natural plant dyes and the one or more natural plant extracts; and a post-processing device for recycling the supercritical carbon dioxide.

In some embodiments, the supercritical carbon dioxide preparation device includes: a carbon dioxide storage tank for storing liquid carbon dioxide; and a carbon dioxide high pressure pump for increasing the pressure of the liquid carbon dioxide.

In some embodiments, the apparatus further comprises: one or more preheaters for heating the carbon dioxide high pressure pump, the natural plant dye extraction kettle, the natural plant dyes and extracts kettle, and the dyeing and functional modification kettle.

In some embodiments, the post-processing device includes: a separating kettle for separating the supercritical carbon dioxide from the one or more natural plant dyes and the one or more natural plant extracts by converting the supercritical carbon dioxide into gaseous carbon dioxide; and a condensing kettle for converting the gaseous carbon dioxide into liquid carbon dioxide.

In some embodiments, the apparatus further comprises: a kettle automatic operation device for automatically opening and closing kettle covers of the natural plant dye extraction kettle, the natural plant dyes and extracts kettle, and the dyeing and functional modification kettle.

In some embodiments, the kettle automatic operation device includes: a frame including an upper bracket, a support beam, a fixed base plate, and expansion bolts; a stretching mechanism for moving the kettle covers in a vertical direction; a rotation mechanism connecting with the stretching mechanism for rotating the kettle covers; and a slide mechanism on the upper bracket for moving the stretching mechanism and the rotation mechanism in a horizontal direction.

In some embodiments, the slide mechanism includes: a slide rail on the upper bracket; one or more sliders that are capable sliding on the slide rail; a mounting plate on the one or more sliders, wherein the mounting plate is connected with one of the stretching mechanism and the rotation mechanism; and two stoppers located on both ends of the slide rail respectively.

In some embodiments, the rotation mechanism includes: a motor connected to the mounting plate; a universal coupling connected to an output end of the motor; a rotation shaft connected to the universal coupling; a cylinder release plate connected to the rotation shaft; and a control apparatus for controlling the operation of the motor.

In some embodiments, the stretching mechanism includes: an air pump; a cylinder located on the magnet placing plate, and connected to the air pump through an air pipe; a magnet placing plate connected to a piston of the cylinder; a magnet located below the magnet placing plate; and a solenoid valve having a first end connecting to the cylinder and a second end connected to the control apparatus; wherein the control apparatus is further configured for controlling the operation of the cylinder through the solenoid valve.

BRIEF DESCRIPTION OF THE DRAWINGS

Various objectives, features, and advantages of the present disclosure can be more fully appreciated with reference to the detailed description of embodiments in connection with the following drawings, in which same reference numerals refer to the same or like elements unless otherwise specified. The following drawings are merely examples for illustrative purposes according to various disclosed embodiments and are not intended to limit the scope of the present disclosure.

DETAILED DESCRIPTION

Figure 1:
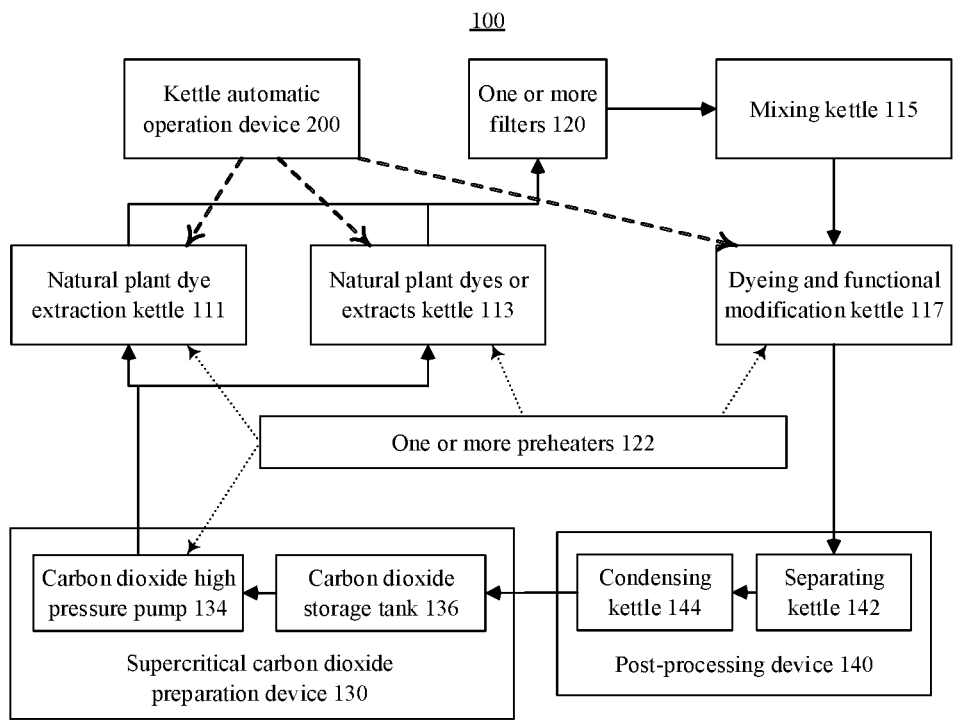
FIG. 1 illustrate a schematic structure diagram of an exemplary apparatus for processing textile fibers in accordance with the present disclosure.

Embodiments of the disclosure will be described in detail with reference to the accompanying drawings. The following description is made only by way of example, but does not limit the present disclosure. Various embodiments of the present disclosure and various features in the embodiments that do not conflict with each other can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

In some embodiments, methods and apparatuses for processing textile fibers, related kettle automatic operation devices, and related textile fiber products are provided to at least solve the following technical problems.

In the disclosed methods for processing textile fibers, the textile fibers can be dyed and functional modified by using supercritical carbon dioxide, without using water or other reagents as a solvent. As such, there is no generation and emissions of waste water and waste byproducts during the entire processing. Therefore, the disclosed methods for processing textile fibers are environmental-friendly functional modification processes.

The disclosed methods used for natural fiber dyeing and modification can have a fast and short process. The operations of the kettles during the process can be automatic without any manual operations. Thus, the labor intensity can be reduced and the efficiency of the disclosed methods is high. The cost of post-processing can be saved, and the production costs can be reduced.

The raw materials used in the disclosed methods for natural fiber dyeing and modification using supercritical carbon dioxide, including carbon dioxide, natural plant dyes, and natural plant extracts, can be fully recycled for a repeated use. Therefore, the production costs can be decreased, and potential pollution can be reduced. The disclosed methods for processing textile fibers can have good social benefits and can be widely used in the textile industry.

The fabrics, garments, home textiles and other textile products manufactured by the disclosed methods do not go through a bleaching process, therefore have no chemical reagent residue, are highly secure to human skin. Further, the fabrics, garments, home textiles and other textile products manufactured by the disclosed methods can have excellent antibacterial and bacteriostatic properties.

The natural fibers processed by the disclosed methods can have uniform colors and excellent color reproducibility. The disclosed methods used for natural fiber dyeing and modification using supercritical carbon dioxide do not damage the natural fibers. The fabric products manufactured by the disclosed methods can have good physical properties, and a color washing fastness up to five degree.

In some embodiments, any suitable textile fibers, including natural fibers and chemical fibers, can be processed by the disclosed methods and apparatuses. For example, the textile fibers can include but not limited to cotton, hemp, silk, polyester, etc.

Referring to FIG. 1, a schematic structure diagram of an exemplary apparatus for processing textile fibers in accordance with the present disclosure. In one embodiment, the apparatus for processing textile fibers may be a machine having one or more integrated machine components. In another embodiment, the apparatus for processing textile fibers may be a flower-dyeing machine, for example, using flowers as dyes for processing the disclosed textile fibers.

The apparatus 100 for processing textile fibers can include a natural plant dye extraction kettle 111, a natural plant dyes and extracts kettle 113, a mixing kettle 115, a dyeing and functional modification kettle 117, a kettle automatic operation device 200, one or more filters 120, one or more preheaters 122, a supercritical carbon dioxide preparation device 130, and a post-processing device 140.

In some embodiments, the supercritical carbon dioxide preparation device 130 can include a carbon dioxide high pressure pump 134 and a carbon dioxide storage tank 136. The carbon dioxide storage tank 136 can be used to store liquid carbon dioxide.

The carbon dioxide storage tank 136 can be connected to the carbon dioxide high pressure pump 134 through a pipeline. The liquid carbon dioxide stored in the carbon dioxide storage tank 136 can be injected into the carbon dioxide high pressure pump 134 to increase the pressure. In some embodiments, the carbon dioxide can be pressurized to about 30 Mpa to about 32 MPa in the carbon dioxide high pressure pump 134.

The carbon dioxide high pressure pump 134 can be heated by one preheater 122. In some embodiments, the preheater 122 can heat the carbon dioxide to about 90° C. to about 120° C. to obtain the supercritical carbon dioxide.

The natural plant dye extraction kettle 111 can be used to extract dye from natural plants. The natural plant dye extraction kettle 111 can be connected to the carbon dioxide high pressure pump 134. The supercritical carbon dioxide can be injected into the natural plant dye extraction kettle 111 to dissolve the pigments in the natural plants. According to different temperatures and different pressures of the supercritical carbon dioxide, the effective components in the pigments of different plants may have different degrees of solubility in the supercritical carbon dioxide. As such, the dyes can be extracted from the natural plants.

The natural plant dyes and extracts kettle 113 can be used to dissolve the natural plant dyes or plant extracts in the supercritical carbon dioxide. The natural plant dyes and extracts kettle 113 can be connected to the carbon dioxide high pressure pump 134. The supercritical carbon dioxide can be injected into the natural plant dyes and extracts kettle 113, and can keep a pressure of about 30 Mpa to about 32 MPa and a temperature of about 90° C. to about 120° C. The natural plant dyes and/or natural plant extracts can be fully contacted with the supercritical carbon dioxide in the natural plant dyes and extracts kettle 113. As such, the natural plant dyes and/or natural plant extracts can be evenly dispersed and dissolved in the supercritical carbon dioxide.

The mixing kettle 115 can be connected to both of the natural plant dye extraction kettle 111 and the natural plant dyes and extracts kettle 113 through pipelines. The supercritical carbon dioxide carrying the extracted plant dyes, and the supercritical carbon dioxide carrying the natural plant extracts can pass through the one or more filters 120, and go into the mixing kettle 117 to be evenly mixed.

The dyeing and functional modification kettle 117 can be connected to the mixing kettle 115 through a pipeline. In some embodiments, the textile fibers to be dyed or modified can be put into the dyeing and functional modification kettle 117, can be heated by one preheater 122 to about 90° C. to about 120° C., and be increased the pressure to 30 Mpa. Then, the supercritical carbon dioxide in the mixing kettle 117 can be injected into the dyeing and functional modification kettle 117. The supercritical carbon dioxide can be circulated in the dyeing and functional modification kettle 117 to fully mix with the textile fibers for about 120 minutes to about 180 minutes. As such, the textile fibers can be dyed or modified in the dyeing and functional modification kettle 117.

Figure 2:
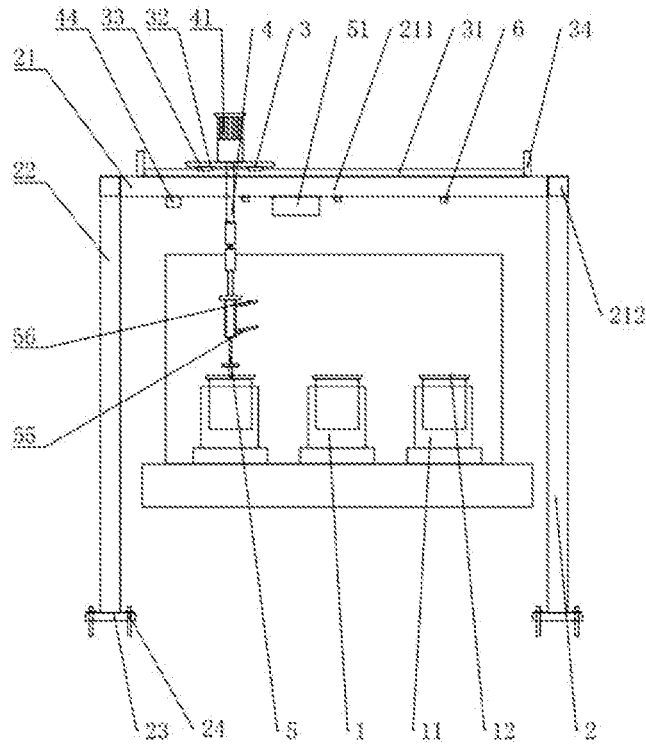
FIG. 2 illustrates a schematic structure diagram of an exemplary kettle automatic operation device in accordance with the present disclosure.

FIG. 2 illustrates a schematic structure diagram of an exemplary kettle automatic operation device in accordance with the present disclosure. The kettle automatic operation device 200 can automatically open and close one or more kettles 1 without manual operation, thereby reducing the labor intensity, reducing the operating time, improving the work efficiency and facilitating the fiber processing.

As shown, the kettle automatic operation device 200 can include a frame 2, at least one slide mechanism 3, at least one rotation mechanism 4, and at least one stretching mechanism 5. The one or more kettles 1 can include a natural plant dye extraction kettle 111, a natural plant dyes and extracts kettle 113, a dyeing and functional modification kettle 117 shown in FIG. 1.

The frame 2 can include an upper bracket 21, a support beam 22, a fixed base plate 23, and expansion bolts 24. The support beam 22 is located on the fixed base plate 23. The upper frame 21 is located on the support beam 22. The expansion bolts 24 are located on the four sides of the fixed base plate 23.

In some embodiments, the frame 2 can include multiple support beams 22 and multiple fixed base plates 23. One support beam 22 can be located in correspondence with one fixed base plate 23. The upper frame 21 can include an upper horizontal beam 211 and an upper vertical beam 212. The upper horizontal beam 211 and the upper vertical beam 212 can be arranged vertically crossed with each other. The expansion bolts 24 can fix the support beams 22 to a base or the ground. The frame 2 can be placed above the one or more kettles 1. In some embodiments, the frame 2 can extend in a direction of the arrangement of multiple kettles 1.

The slide mechanism 3 can includes a slide rail 31, a mounting plate 32, and one or more sliders 33. The slide rail 31 can be located on the upper frame 21 along a longitudinal direction of the upper frame 21. The one or more sliders 33 can be located on the slide rail 31. The mounting plate 32 is located on the one or more sliders 33.

Two stoppers 34 can be located on the upper frame 21 on both sides of the slide rail 31 for preventing the derailment accident. When the one or more sliders 3 are moving along the slide rail 31, the one or more sliders 3 can drive the mounting plate 32 to move from a first position above one kettle 1 to a second position above another kettle 1.

Figure 3:
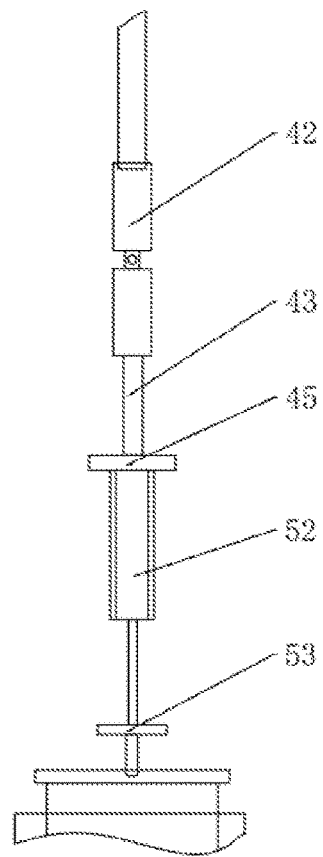
FIG. 3 illustrates a schematic structure diagram of an exemplary rotation mechanism and an exemplary stretching mechanism of a kettle automatic operation device in accordance with the present disclosure.
Figure 4:
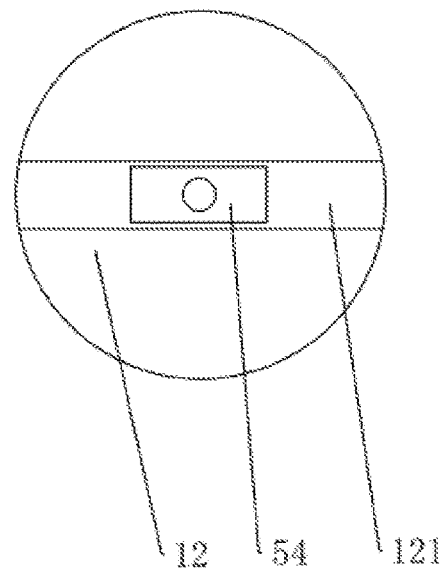
FIG. 4 illustrates a schematic structure diagram of an exemplary kettle cover and an exemplary magnet of a kettle automatic operation device in accordance with the present disclosure.

FIG. 3 illustrates a schematic structure diagram of an exemplary rotation mechanism and an exemplary stretching mechanism of a kettle automatic operation device in accordance with the present disclosure. FIG. 4 illustrates a schematic structure diagram of an exemplary kettle cover and an exemplary magnet of a kettle automatic operation device in accordance with the present disclosure.

The rotation mechanism 4 can be located on the mounting plate 32. The rotation mechanism 4 can include a motor 41, a universal coupling 42, a rotation shaft 43, a control apparatus 44, and a cylinder release plate 45. The motor 41 can be connected to the mounting plate 32. An output end of the motor 41 can be connected to one end of the universal coupling 42. Another end of the universal coupling 42 can be connected to one end of the rotation shaft 43. The cylinder release plate 45 can be located on another end of the rotation shaft 43.

The stretching mechanism 5 can include an air pump 51, a cylinder 52, a magnet placing plate 53, a magnet 54, an air pipe 55, and a solenoid valve 56. The cylinder 52 can be located on the magnet placing plate 53. The cylinder 52 can be connected to the air pump 51 through the air pipe 55.

A piston of the cylinder 52 can be connected to the magnet placing plate 53. The magnet 54 can be located below the magnet placing plate 53. One end of the solenoid valve 56 can be connected to the cylinder 52, and another end of the solenoid valve 56 can be connected to the control apparatus 44. The control apparatus 44 can control the operation of the cylinder 52 through the solenoid valve 56.

Each of the one or more kettles 1 can include a kettle body 11 and a kettle cover 12. A recessed groove 121 can be located on an upper portion of the kettle cover 12, and be symmetric respect to a central axis of the kettle cover 12, and can penetrate the kettle cover 12 in a horizontal direction. The magnet 54 can have a square shape, and can be arranged to match the recessed groove 121.

In some embodiments, the kettle cover 12 of the kettle 1 can be opened and closed by rotating the rotation mechanism 4. The magnet 54 can fix the kettle cover 12 to the stretching mechanism 5. The kettle cover 12 can be fastened by the magnet 54 to prevent from slipping.

When the motor 41 of the rotation mechanism 4 is rotating in a positive direction, the kettle cover 12 can be rotated in the positive direction alone with the rotation mechanism 4 due to the magnet 54. Driven by the cylinder 51, the length of the stretching mechanism 5 can be shorten. The control apparatus 44 can coordinate the rotation mechanism 4 and the stretching mechanism 5 to continuously raise the kettle cover 12. As such, the kettle cover 12 can be separated from the kettle body 11.

Similarly, when the motor 41 of the rotation mechanism 4 is rotating in a negative direction, the kettle cover 12 can be rotated in the negative direction alone with the rotation mechanism 4 due to the magnet 54. Driven by the cylinder 51, the length of the stretching mechanism 5 can be lengthen. The control apparatus 44 can coordinate the rotation mechanism 4 and the stretching mechanism 5 to continuously lower the kettle cover 12. As such, the kettle cover 12 can be tightened with the kettle body 11.

Therefore, the kettle cover 12 of the kettle 1 can be opened and closed by rotating the rotation mechanism 4, thereby reducing the labor intensity, reducing the operating time, improving the work efficiency and facilitating the fiber processing.

In some embodiments, one or more sensors 6 can be located on the upper frame 21. The one or more sensors can be electrically connected to the control apparatus 44. In some embodiments, each sensor 6 can be located in correspondence with one kettle 1. When the rotation mechanism 4 moves to a position above one kettle 1, the sensor 6 corresponding to the one kettle can receive a signal. The sensor 6 can cause the rotation mechanism 4 to stop moving, and to perform a subsequence operation. As such, the multiple kettles 1 can be operated by the rotation mechanism 4 in turn. The position correspondence between the rotation mechanism 4 and each kettle 1 can be determined accurately.

Referring back to FIG. 1, the post-processing device 140 can include a separating kettle 142 and a condensing kettle 144. The separating kettle 142 can be used to separate the supercritical carbon dioxide from the natural plant dyes and natural plant extracts. The temperature of the separating kettle 142 can be set to about 80° C. to about 100° C., and the pressure of the separating kettle 142 can be set to about 2 MPa to about 3 MPa.

After the separation, the gaseous carbon dioxide can enter the condensing kettle 144, and the natural plant dyes and the natural plant extracts can be left in the separating kettle 142. The temperature of the condensing kettle 144 can be set as the room temperature, such as about 20° C. to about 25° C. The pressure of the condensing kettle 144 can be set as about 4 MPa to about 6 MPa. The gaseous carbon dioxide can be converted into the liquid carbon dioxide for recycling in the condensing kettle 144. As such, the liquid carbon dioxide can then reflux into the carbon dioxide storage tank 136 to participate in a next round of dyeing process or functional modification process.

It is noted that, in FIG. 1, the solid lines with arrows indicate that the components connected by the solid lines are interconnected through one or more pipelines, and the arrows indicates the moving directions of the gas flow or liquid flow. The dotted lines with arrows indicate that the components are heated by the one or more preheaters 122, and the arrows indicate the directions of the heat transfer. The hollow dashed lines with arrows indicate that the kettles pointed by the arrows are automatically operated by the kettle automatic operation device 200.

Figure 5:
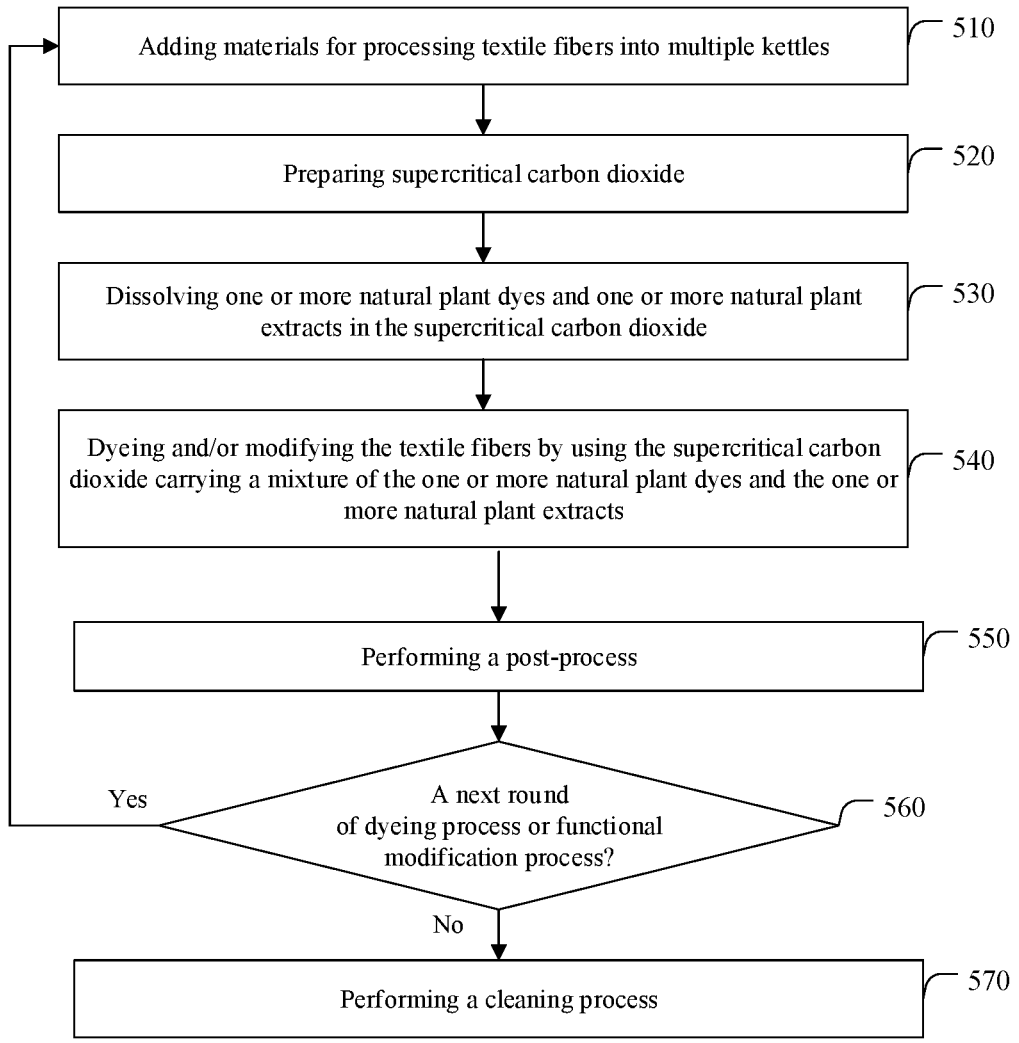
FIG. 5 illustrates a schematic flow diagram of an exemplary method for processing textile fibers in accordance with the present disclosure.

FIG. 5 illustrates a schematic flow diagram of an exemplary method for processing textile fibers in accordance with the present disclosure. The disclosed method can be implemented by the apparatus 100 for processing textile fibers described above in connection with FIG. 1.

Figure 6:
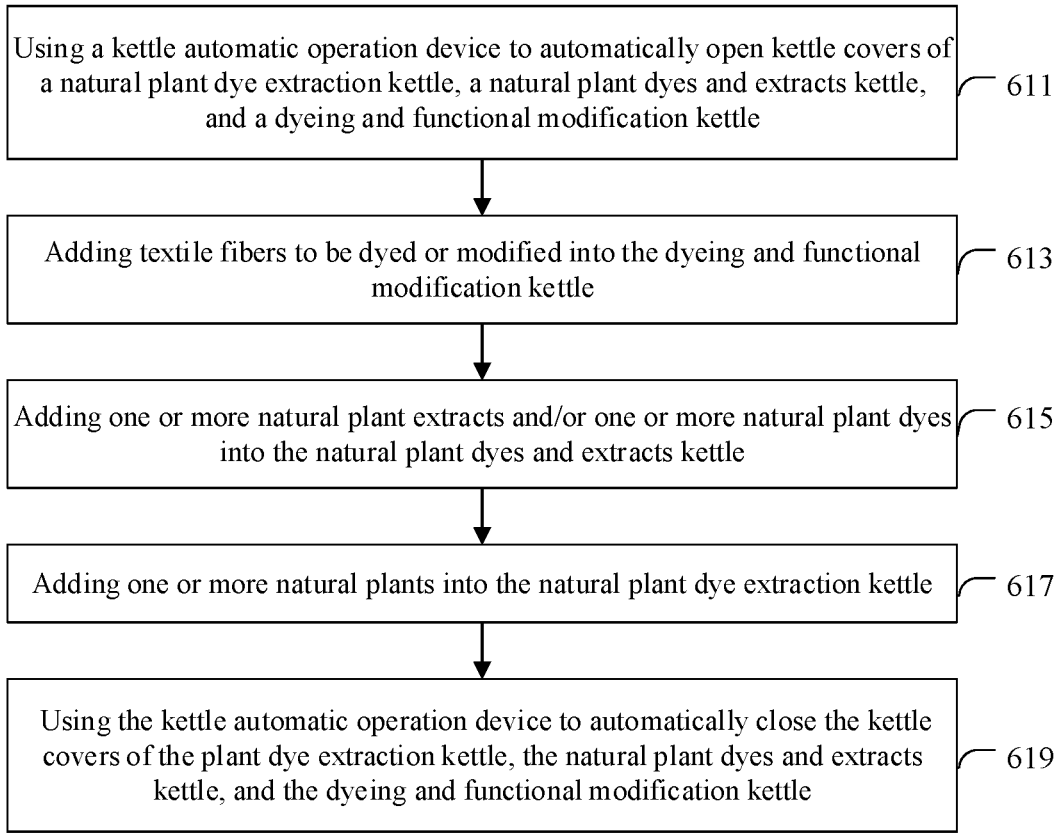
FIG. 6 illustrates a schematic flow diagram of an exemplary process for adding materials for processing textile fibers into multiple kettles in accordance with the present disclosure.

As shown, at step 510, materials for processing textile fibers can be added into multiple kettles. FIG. 6 illustrates a schematic flow diagram of an exemplary process for adding materials for processing textile fibers into multiple kettles in accordance with the present disclosure.

At 611, a kettle automatic operation device can automatically open kettle covers of a natural plant dye extraction kettle, a natural plant dyes and extracts kettle, and a dyeing and functional modification kettle. The automatic opening operations of the kettle covers by the kettle automatic operation device can be referred to the described above in connection with FIGS. 2-4.

At 613, textile fibers to be dyed or modified can be added into the dyeing and functional modification kettle. The textile fibers can include natural fibers, such as cotton, hemp, silk, etc., or chemical fibers, such as polyester, etc., or any fabrics made by the textile fibers. In some embodiments, a weight of the textile fibers added into the dyeing and functional modification kettle can be in a range from about 50 Kg to about 100 Kg.

At 615, one or more natural plant extracts can be added into the natural plant dyes and extracts kettle. The natural plant extract can include one or more of the mint extract, the wormwood extract, the grass coral extract, etc. A weight of the one or more natural plant extracts can be in a range from about 0.5 Kg to about 2 Kg. In some other embodiments, one or more natural plant dyes can also be added into the natural plant dyes and extracts kettle. The one or more natural plant dyes can include one or more of the rose dyes, violet dyes, safflower dyes, perilla dyes, etc. A weight of the one or more natural plant dyes can be in a range from about 1 Kg to about 3 Kg.

At 617, one or more natural plants can be added into the natural plant dye extraction kettle. The one or more natural plants can include any suitable natural plant flowers or natural plant dried flowers. A weight of the one or more natural plants added into the natural plant dye extraction kettle can be in a range from 5 Kg to 20 Kg.

It is note that, the weights of the one or more natural plants, the one or more natural plant dyes, the one or more natural plant extracts, and the textile fibers described above are merely examples, which do not limit the present disclosure. In some embodiments, a mass ratio of the textile fibers and the one or more natural plant dyes can be in a range from about 50:1 to about 20:1. A mass ratio of the textile fibers and the one or more natural plants can be in a range from about 20:1 to about 10:1. A mass ratio of the textile fibers and the one or more natural plant extracts can be in a range from about 20:1 to about 10:1.

In some embodiments, the selection of the one or more natural plant extracts and/or the one or more natural plat dyes can be determined based on the type of the textile fibers to be dyed or modified. For example, the rose dyes and mint extracts can be selected for dyeing and/or functional modification for natural cotton fibers.

At 619, the kettle automatic operation device can automatically close the kettle covers of the plant dye extraction kettle, the natural plant dyes and extracts kettle, and the dyeing and functional modification kettle. The automatic closing operations of the kettle covers by the kettle automatic operation device can be referred to the described above in connection with FIGS. 2-4.

Figure 7:
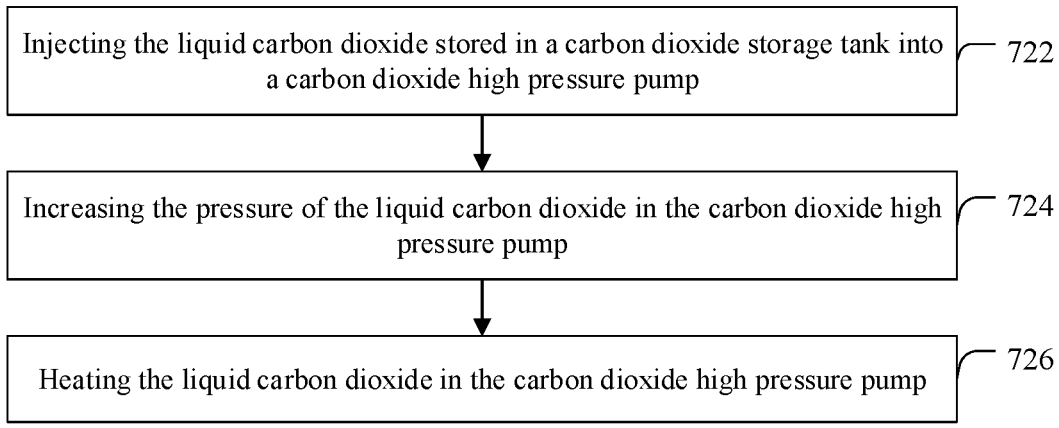
FIG. 7 illustrates a schematic flow diagram of an exemplary process for preparing the supercritical carbon dioxide in accordance with the present disclosure.

Referring back to FIG. 5, at 520, the supercritical carbon dioxide can be prepared. FIG. 7 illustrates a schematic flow diagram of an exemplary process for preparing the supercritical carbon dioxide in accordance with the present disclosure.

At 722, the liquid carbon dioxide stored in the carbon dioxide storage tank can be injected into the carbon dioxide high pressure pump. At 724, the pressure of the liquid carbon dioxide in the carbon dioxide high pressure pump can be increased to about 30 Mpa-32 MPa. At 726, the liquid carbon dioxide can be heated to about 90° C.-120° C. As such, the supercritical carbon dioxide can be obtained.

Figure 8:
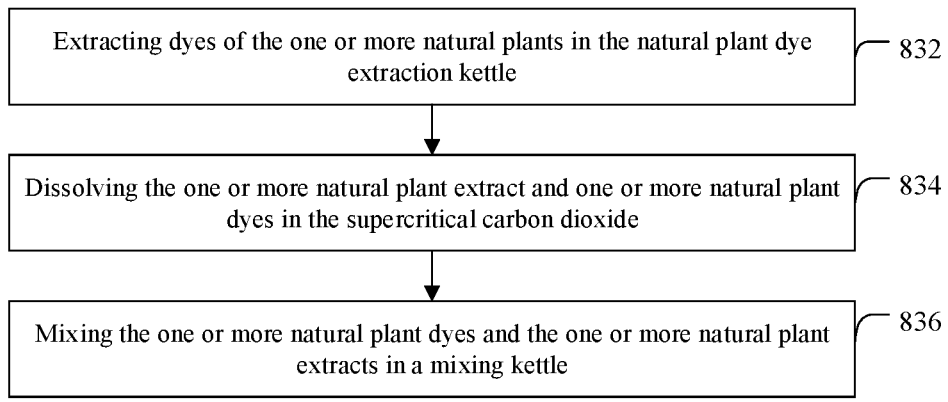
FIG. 8 illustrates a schematic flow diagram of an exemplary process for dissolving one or more natural plant dyes and one or more natural plant extracts in the supercritical carbon dioxide in accordance with the present disclosure.

Referring back to FIG. 5, at 530, a mixture of the one or more natural plant dyes and the one or more natural plant extracts can be dissolved in the supercritical carbon dioxide. FIG. 8 illustrates a schematic flow diagram of an exemplary process for dissolving one or more natural plant dyes and one or more natural plant extracts in the supercritical carbon dioxide in accordance with the present disclosure.

At 832, the dyes of the one or more natural plants in the natural plant dye extraction kettle can be extracted. In some embodiments, a pressure of the natural plant dye extraction kettle can be increased to about 30 Mpa to about 32 MPa, and a temperature of the natural plant dye extraction kettle can be increased to about 90° C.-120° C. According to different temperatures and different pressures of the supercritical carbon dioxide, the effective components in the pigments of different plants may have different degrees of solubility in the supercritical carbon dioxide. As such, the pigments in the natural plants can be dissolved in the supercritical carbon dioxide, and the dyes can be extracted from the natural plants. It is noted that, in some other embodiments, when the one or more natural plant dyes are directly added into the natural plant dyes and extracts kettle at 515, step 832 can be omitted.

At 834, the one or more natural plant extracts in the natural plant dyes and extracts kettle can be dissolved in the supercritical carbon dioxide. In some embodiments, the supercritical carbon dioxide prepared at 520 can be injected into the natural plant dyes and extracts kettle. A pressure of the natural plant dyes and extracts kettle can be increased to about 30 Mpa to about 32 MPa, and a temperature of the natural plant dyes and extracts kettle can be increased to about 90° C.-120° C. The supercritical carbon dioxide can be fully contacted with the one or more natural plant extracts. As such, the one or more natural plant extracts can be evenly dispersed and then dissolved in the supercritical carbon dioxide.

In some other embodiments, when the one or more natural plant dyes are also directly added into the natural plant dyes and extracts kettle, the supercritical carbon dioxide can be fully contacted with the one or more natural plant dyes and the one or more natural plant extracts. As such, the one or more natural plant dyes and the one or more natural plant extracts can be evenly dispersed and then dissolved in the supercritical carbon dioxide.

At 836, the one or more natural plant dyes and the one or more natural plant extracts can be mixed in a mixing kettle. The supercritical carbon dioxide carrying the one or more natural plant dyes extracted at 832 can pass through a filter, and enter the mixing kettle through a pipeline. The supercritical carbon dioxide carrying the one or more natural plant prepared at 834 can pass through a filter, and enter the mixing kettle through another pipeline. The supercritical carbon dioxide carrying the one or more natural plant dyes and the supercritical carbon dioxide carrying the one or more natural plant can be mixed together in the mixing kettle. As such, the one or more natural plant dyes and the one or more natural plant extracts can be evenly dispersed and then dissolved in the supercritical carbon dioxide.

In some embodiments, when the one or more natural plant dyes are also directly added into the natural plant dyes and extracts kettle, step 832 can be omitted. Thus, the supercritical carbon dioxide carrying a mixture of the one or more natural plant dyes and the one or more natural plant extracts at 834 can pass through a filter, and enter the mixing kettle through a pipeline.

At 540, the textile fibers can be dyed and/or modified by using the supercritical carbon dioxide carrying a mixture of the one or more natural plant dyes and the one or more natural plant extracts. In some embodiments, the dyeing and functional modification kettle can be heated and pressurized. A temperature of the dyeing and functional modification kettle can be set in a range from about 90° C. to about 120° C. A pressure of the dyeing and functional modification kettle can be set as about 30 MPa.

The supercritical carbon dioxide carrying the mixture of the one or more natural plant dyes and the one or more natural plant extracts in the mixing kettle can be injected into the dyeing and functional modification kettle. The supercritical carbon dioxide can be circulated in the dyeing and functional modification kettle to fully mix with the textile fibers for a time period. As such, the textile fibers can be dyed and/or modified in the dyeing and functional modification kettle.

In some embodiments, the time period can be determined based on the type of the textile fibers to be dyed or modified, and the expected properties of the textile fibers after the dyeing and/or functional modification process. For example, the time period can be related to the antibacterial rate, the fineness, the dry breaking strength, the wet breaking strength, and the dry breaking elongation, the color washing fastness of the stained dyes, the instantly touching cool sensation, etc. In some embodiments, the time period can be in a range from about 90 minutes to 180 minutes.

Figure 9:
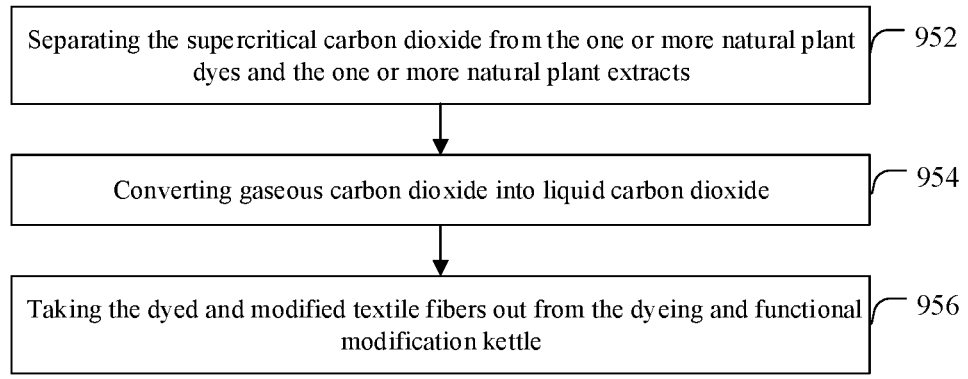
FIG. 9 illustrates a schematic flow diagram of an exemplary post-process in accordance with the present disclosure.

At 550, after the process for dyeing and functional modification to the textile fibers, a post-process can be performed. FIG. 9 illustrates a schematic flow diagram of an exemplary post-process in accordance with the present disclosure.

At 952, the supercritical carbon dioxide can be separated from the one or more natural plant dyes and one or more natural plant extracts. In some embodiments, the supercritical carbon dioxide carrying the mixture of the one or more natural plant dyes and the one or more natural plant extracts can be transferred from the dyeing and functional modification kettle to a separating kettle. A temperature of the separating kettle 142 can be set to about 80° C. to about 100° C., and a pressure of the separating kettle 142 can be set to about 2 MPa to about 3 MPa. As such, the gaseous carbon dioxide can enter a condensing kettle, and the natural plant dyes and the natural plant extracts can be left in the separating kettle.

At 954, the gaseous carbon dioxide can be converted into the liquid carbon dioxide. In some embodiments, a temperature of the condensing kettle can be set as the room temperature, such as about 20° C. to about 25° C. The pressure of the condensing kettle can be set as about 4 MPa to about 6 MPa. As such, the gaseous carbon dioxide can be converted into the liquid carbon dioxide for recycling in the condensing kettle. As such, the liquid carbon dioxide can then reflux into the carbon dioxide storage tank to participate in a next round of dyeing process or functional modification process.

At 956, the dyed and modified textile fibers can be taken out from the dyeing and functional modification kettle. In some embodiments, the kettle automatic operation device can open the kettle cover of the dyeing and functional modification kettle. The dyed and modified textile fibers can be taken out from the dyeing and functional modification kettle.

Referring back to FIG. 5, at 560, it can be determined whether a next round of dyeing process or functional modification process is to be performed. In response to determining that a next round of dyeing process or functional modification process is to be performed ("Yes" at 560), the process can go back to 510 to add materials for the next round of dyeing process or functional modification process into the multiple kettles.

Figure 10:
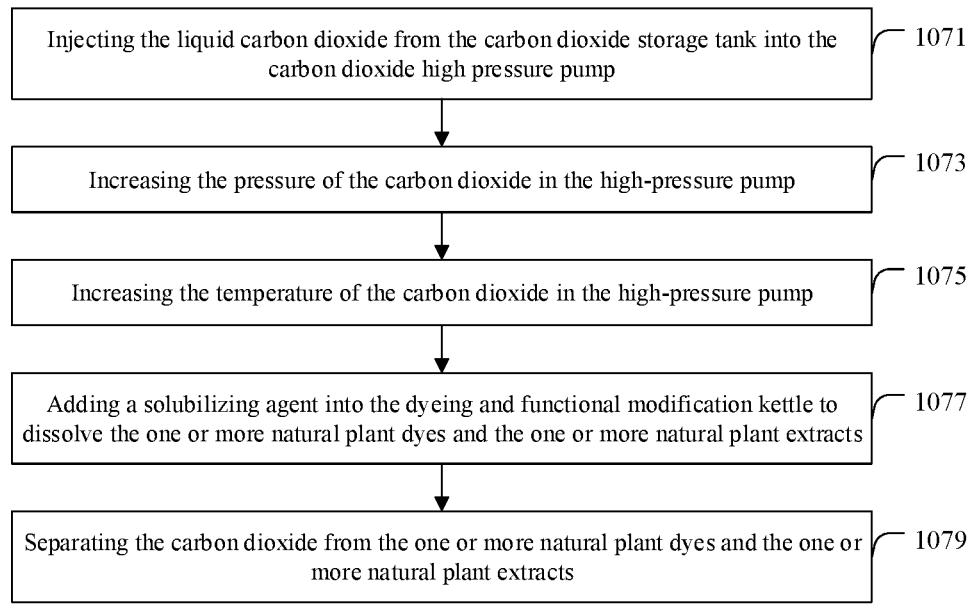
FIG. 10 illustrates a schematic flow diagram of an exemplary cleaning process in accordance with the present disclosure.

In response to determining that a next round of dyeing process or functional modification process is not to be performed ("No" at 560), the process can perform a cleaning process to the apparatus at 570. FIG. 10 illustrates a schematic flow diagram of an exemplary cleaning process in accordance with the present disclosure.

At 1071, the liquid carbon dioxide stored in the carbon dioxide storage tank can be injected into the carbon dioxide high pressure pump. At 1073, the carbon dioxide in the high-pressure pump can be pressurized to about 7.382 MPa. At 1075, a temperature of the carbon dioxide in the high-pressure pump can be heated to about 65° C. to about 70° C. by one preheater.

At 1077, a solubilizing agent can be added into the dyeing and functional modification kettle to dissolve the one or more natural plant dyes and the one or more natural plant extracts. In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

At 1079, the stirred fluid can pass through the separator to separate the carbon dioxide from the one or more natural plant dyes and the one or more natural plant extracts. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the one or more natural plant dyes and the one or more natural plant extracts.

In some embodiments, the gaseous carbon dioxide can enter the condenser. The one or more natural plant dyes and the one or more natural plant extracts can be remained in the separator. Therefore, the one or more natural plant dyes and the one or more natural plant extracts in the pipelines can be cleaned up.

It should be noted that the above steps of the flow diagrams of FIGS. 5-10 can be executed or performed in any order or sequence not limited to the order and sequence shown and described in the figure. Also, some of the above steps of the flow diagrams of FIGS. 5-10 can be executed or performed substantially simultaneously where appropriate or in parallel to reduce latency and processing times. Furthermore, it should be noted that FIGS. 5-10 are provided as examples only. At least some of the steps shown in the figures may be performed in a different order than represented, performed concurrently, or altogether omitted.

In the disclosed methods for processing textile fibers, the textile fibers can be dyed and modified by using supercritical carbon dioxide, without using water or other reagents as a solvent. As such, there is no generation and emissions of waste water and waste byproducts during the entire processing. Therefore, the significant cost for processing solid waste and/or liquid waste can be saved. The disclosed methods for processing textile fibers are eco-friendly and environmental-friendly functional modification processes.

The disclosed methods used for natural fiber dyeing and modification can have a fast and short process. The operations of the kettles during the process can be automatic without any manual operations. And after the dyeing and modification process, the supercritical carbon dioxide can be rapidly gasified, thus there is no need to dry the dyed or functional modified fibers. Thus, the labor intensity can be reduced and the efficiency of the disclosed methods is high. The cost of post-processing can be saved, and the production costs can be reduced.

The raw materials used in the disclosed methods for natural fiber dyeing and modification using supercritical carbon dioxide, including carbon dioxide, natural plant dyes, and natural plant extracts, can be fully recycled for a repeated use. Carbon dioxide is non-toxic, tasteless, and nonflammable. The dyeing and modification process requires no dispersants, stabilizers or buffers. Therefore, the production costs can be decreased, and potential pollution can be reduced. The disclosed methods for processing textile fibers can have good social benefits and can be widely used in the textile industry.

The fabrics, garments, home textiles and other textile products manufactured by the disclosed methods do not go through a bleaching process, therefore have no chemical reagent residue, are highly secure to human skin. Further, the fabrics, garments, home textiles and other textile products manufactured by the disclosed methods can have excellent antibacterial and bacteriostatic properties.

The natural fibers processed by the disclosed methods can have uniform colors and excellent color reproducibility. The disclosed methods used for natural fiber dyeing and modification using supercritical carbon dioxide do not damage the natural fibers. The fabric products manufactured by the disclosed methods can have good physical properties, and a color fastness up to five degree.

The natural fibers processed by the disclosed methods can have excellent physical properties. For example, a wet breaking strength of the modified natural cotton fiber can be in a range from about 2.8 cN/dtex to about 3.5 cN/dtex, a wet breaking strength of the modified natural silk fiber can be in a range from about 30 cN/dtex to about 33 cN/dtex, a wet breaking strength of the modified natural wool fiber can be in a range from about 1.9 cN/dtex to about 2.7 cN/dtex, and a wet breaking strength of the modified polyester fiber can be in a range from about 4.1 cN/dtex to about 5.0 cN/dtex.

The natural fibers processed by the disclosed methods can have excellent antibacterial and bacteriostatic properties. For example, a modified natural cotton fiber having: an inhibitory rate to *Escherichia coli* in a range from about 93% to about 95%, an inhibition rate to *Staphylococcus aureus* in a range from about 91% to about 95%, an inhibitory rate to *Candida albicans* in a range from about 87% to about 89%. As another example, a modified polyester fiber having: an inhibitory rate to *Escherichia coli* in a range from about 90% to about 98%, an inhibition rate to *Staphylococcus aureus* in a range from about 92% to about 96%, an inhibitory rate to *Candida albicans* in a range from about 87% to about 88%. As yet another example, a knitted fabric made by modified cotton-blended fiber having: an inhibitory rate to *Escherichia coli* in a range from about 93% to about 97%, an inhibition rate to *Staphylococcus aureus* in a range from about 93% to about 95%, an inhibitory rate to *Candida albicans* in a range from about 87% to about 96%. As yet another example, a modified natural silk fiber having: an inhibitory rate to *Escherichia coli* in a range from about 91% to about 94%, an inhibition rate to *Staphylococcus aureus* in a range from about 89% to about 92%, an inhibitory rate to *Candida albicans* in a range from about 84% to about 91%.

In the following, multiple examples are described to show the implementations of the disclosed method for processing the textile fibers.

Example 1

The Rose Dye and/or the Mint Extract are Used to Dye and Modify the Natural Cotton Fiber.

About 50 Kg natural cotton fibers to be dyed or modified can be added into the dyeing and functional modification kettle. About 2 Kg rose dye and/or about 1 Kg mint extract can be added into the mixing kettle. The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa, and the temperature of the liquid carbon dioxide can be heated to about 120° C. to obtain the supercritical carbon dioxide.

The supercritical carbon dioxide can be injected into the mixing kettle. A pressure of the mixing kettle can be increased to about 30 Mpa, and a temperature of the mixing kettle can be increased to about 120° C. The supercritical carbon dioxide can be fully contacted with the rose dye and/or the mint extract and to fully dissolve the rose dye and/or mint extract.

The dyeing and functional modification kettle can be heated and pressurized. A temperature of the dyeing and functional modification kettle can be set to about 120° C. A pressure of the dyeing and functional modification kettle can be set to about 30 MPa. The supercritical carbon dioxide carrying the rose dye and/or the mint extract in the mixing kettle can be injected into the dyeing and functional modification kettle. The supercritical carbon dioxide can be circulated in the dyeing and functional modification kettle to fully mix with the natural cotton fiber for about a time period.

After the process for dyeing and functional modification to the textile fibers, a post-process can be performed. The supercritical carbon dioxide carrying the rose dye and/or the mint extract can be transferred from the dyeing and functional modification kettle to the separating kettle. A temperature of the separating kettle can be set to about 100° C., and a pressure of the separating kettle can be set to about 4 MPa. The gaseous carbon dioxide can enter a condensing kettle, and the rose dye and/or the mint extract can be left in the separating kettle.

A temperature of the condensing kettle can be set as the room temperature, such as about 20° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified cotton fiber can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the rose dye and/or mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the rose dye and/or mint extract. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the rose dye and/or mint extract. The gaseous carbon dioxide can enter the condenser. The rose dye and/or mint extract can be remained in the separator. Therefore, the rose dye and/or mint extract in the pipelines can be cleaned up.

The specific antibacterial rate of the functional modified natural cotton fiber can be related to the time period. The effects of the time period for functional modification process on the specific antibacterial rate can be shown in Table 1 below.

TABLE 1

| Time period for functional modification process (minute) | Antibacterial rate (%) | | |
| --- | --- | --- | --- |
| | Escherichia coli | Staphylococcus aureus | Candida albicans |
| 30 | 70 | 72 | 65 |
| 60 | 76 | 78 | 71 |
| 90 | 88 | 83 | 79 |
| 120 | 93 | 94 | 87 |
| 150 | 94 | 95 | 89 |
| 180 | 94 | 95 | 89 |

As shown in Table 1, with the increasing of the time period for functional modification process, the functional modified natural cotton fiber can have better antibacterial rates to *Escherichia coli, Staphylococcus aureus*, and *Candida albicans*. However, when the time period for functional modification process is more than 120 minutes, the increases of the antibacterial rates are not significant. Therefore, the time period for functional modification process for natural cotton fiber can be about 120 minutes.

As shown in Table 1, when the rose dye and the mint extract are used to dye and modify the natural cotton fiber for about 120 minutes, the modified natural cotton fiber can have an inhibitory rate to *Escherichia coli* in a range from about 93% to about 95%, an inhibition rate to *Staphylococcus aureus* in a range from about 91% to about 95%, an inhibitory rate to *Candida albicans* in a range from about 87% to about 89%.

Example 2

The rose dye and/or the mint extract are used to dye and modify the natural fibers including natural cotton fiber, natural silk fiber, and natural wool fiber that have same fineness, breaking strength and other physical indicators. The dyeing and functional modification process can be referred to Example 1 described above.

The specific properties of the functional modified natural fibers can be shown in Table 2 below. It is noted that, in the testing groups the supercritical carbon dioxide is used in the dyeing and modification process, while in the reference groups ('Ref group' in Table 2) the water is used as a solvent in the dyeing and modification process.

TABLE 2

|  |  | Fineness (dtex) | Dry breaking strength (cN/dtex) | Wet breaking strength (cN/dtex) | Elongation (%) | Inhibitory rate (%) | | |
|---|---|---|---|---|---|---|---|---|
|  |  |  |  |  |  | *Escherichia coli* | *Staphylococcus aureus* | *Candida albicans* |
| Natural cotton fiber | Testing group | 1.67 | 2.75 | 3.5 | 7.25 | 93 | 94 | 87 |
|  | Ref group | 1.67 | 2.65 | 2.79 | 7.03 | 92 | 94 | 85 |
| Natural silk fiber | Testing group | 1.67 | 28.7 | 32.2 | 35 | 98 | 96 | 97 |
|  | Ref group | 1.67 | 27.3 | 29.04 | 32.8 | 92 | 93 | 86 |
| Natural wool fiber | Testing group | 1.67 | 2.83 | 2.61 | 24.1 | 97 | 95 | 96 |
|  | Ref group | 1.67 | 2.76 | 1.89 | 24.4 | 92 | 94 | 86 |

As shown in the testing groups of Table 2, the natural cotton fiber, natural silk fiber, and the natural wool fiber containing the mint extract that has a weight of 1% of the weight of the natural fiber can be processed respectively by using the supercritical carbon dioxide. In the reference groups of Table 2, the natural cotton fiber, natural silk fiber, and the natural wool fiber containing the mint extract that has a weight of 1% of the weight of the natural fiber can be processed respectively by using the water as the solvent.

Comparing the properties of the modified natural fibers shown in the testing groups and the reference groups of Table 2, it is noted that, the physical properties of the modified natural fibers including the dry breaking strength, the wet breaking strength, and the dry breaking elongation, are proximately same. Further, the antibacterial rates to *Escherichia coli, Staphylococcus aureus*, and *Candida albicans* are also close to each other.

As shown in Table 2, when using the rose dye and/or the mint extract to functional modify the natural silk fiber for about 120 minutes, the modified natural silk fiber can have a dry breaking strength as about 28.7 cN/dtex, a wet breaking strength as about 32.2 cN/dtex, a dry breaking elongation as about 35%, an antibacterial rate to *Escherichia coli* as about 98%, an antibacterial rate to *Staphylococcus aureus* as about 96%, and an antibacterial rate to *Candida albicans* as about 97%.

When using the rose dye and/or the mint extract to functional modify the natural woll fiber for about 120 minutes, the modified natural wool fiber can have a dry breaking strength as about 2.83 cN/dtex, a wet breaking strength as about 2.61 cN/dtex, a dry breaking elongation as about 24.1%, an antibacterial rate to *Escherichia coli* as about 97%, an antibacterial rate to *Staphylococcus aureus* as about 95%, and an antibacterial rate to *Candida albicans* as about 96%.

The mint extract includes menthone, menthol and other chemical ingredients that can provide cool senses. The textile fibers modified by using the mint extract can be weaved into fabric that can be tested on the instantly touching cool sensation (Q-max). The value of Q-max can indicate a maximum amount of heat loss on human skin surface when touches the fabric, which is also the maximum heat flow through the fabric. A unit of Q-max is heat flow per square centimeter ($W/cm^2$).

The standard indicator of Q-max is equal to or larger than 0.140 $W/cm^2$. A test sample of the fabric weaved by the textile fibers modified by using the mint extract can be 20×20 square centimeters, a measuring area can be about 5×5 square centimeters. The sample to be tested can be placed in an environment having a temperature of about 20±2° C. and a humidity of about 65±2% for about 24 hours before testing. The instrument for measuring Q-max can be a thermal effect tester, such as KES-F7 THERMO II. A testing result of Q-max is 0.390 $W/cm^2$. The testing result of Q-max can be an average of five testing data, and have a valid data for three decimal places. Clearly, the testing result of Q-max is much higher than the standard indicator of Q-max.

Further, the color washing fastness of the rose dye of the textile fibers processed by using the supercritical carbon dioxide can be up to level five, while the color washing fastness of the rose dye of the textile fibers processed by using the water as the solvent is only level three.

It is noted that, when the fabric including at least 30% of the textile fibers modified by using the mint extract, and less than 70% of the ordinary viscose fiber, the performance indicators of the fabric can achieve the properties described above.

Example 3

The violet dye and/or the wormwood extract are used to dye and modify the natural fibers.

About 50 Kg natural fiber to be dyed or modified can be added into the dyeing and functional modification kettle. The natural fiber can be natural cotton fiber, natural linen fiber, natural silk fiber, and/or natural wool fiber. About 1 Kg of wormwood extract can be added into the natural plant dyes and extracts kettle.

The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa to about 32 Mpa, and the temperature of the liquid carbon dioxide can be heated to about 90° C. to about 120° C. to obtain the supercritical carbon dioxide.

About 5 Kg of violet plant fresh petals and/or dry petals can be added into the natural plant dye extraction kettle. The natural plant dye extraction kettle can be pressured to about 30 Mpa, and be heated to about 90° C. The supercritical carbon dioxide can be injected into the natural plant dye extraction kettle. According to different temperatures and different pressures of the supercritical carbon dioxide, the effective components in the pigments of violet plant may have different degrees of solubility in the supercritical carbon dioxide. As such, the pigments in the violet plant petals can be dissolved in the supercritical carbon dioxide, and the violet dye can be extracted.

The supercritical carbon dioxide can also be injected into the natural plant dyes and extracts kettle. A pressure of the natural plant dyes and extracts kettle can be increased to about 30 Mpa to about 32 MPa, and a temperature of the natural plant dyes and extracts kettle can be increased to about 90° C.-120° C. The supercritical carbon dioxide can be fully contacted with the wormwood extract. As such, the wormwood extract can be evenly dispersed and then dissolved in the supercritical carbon dioxide.

The supercritical carbon dioxide carrying the wormwood extract and the supercritical carbon dioxide carrying the violet dye can pass through one or more filters, and enter the mixing kettle through one or more pipelines, and be mixed together in the mixing kettle. As such, the wormwood extract and the violet dye can be evenly dispersed and dissolved in the supercritical carbon dioxide.

The dyeing and functional modification kettle can be heated and pressurized. A temperature of the dyeing and functional modification kettle can be set to about 90° C. A pressure of the dyeing and functional modification kettle can be set to about 30 MPa. The supercritical carbon dioxide carrying the wormwood extract and the violet dye in the mixing kettle can be injected into the dyeing and functional modification kettle. The supercritical carbon dioxide can be circulated in the dyeing and functional modification kettle to fully mix with the natural fiber for about 120 minutes.

After the process for dyeing and functional modification to the textile fibers, a post-process can be performed. The supercritical carbon dioxide carrying the wormwood extract and the violet dye can be transferred from the dyeing and functional modification kettle to the separating kettle. A temperature of the separating kettle can be set to about 80° C., and a pressure of the separating kettle can be set to about 2 MPa. The gaseous carbon dioxide can enter a condensing kettle, and the wormwood extract and the violet dye can be left in the separating kettle.

A temperature of the condensing kettle can be set as the room temperature, such as about 20° C. to 25° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified natural fiber can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the rose dye and/or mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the wormwood extract and the violet dye. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the wormwood extract and the violet dye. The gaseous carbon dioxide can enter the condenser. The wormwood extract and the violet dye can be remained in the separator. Therefore, the wormwood extract and the violet dye in the pipelines can be cleaned up.

The wormwood extract and the violet dye are used to dye and modify the natural fibers including natural cotton fiber, natural linen fiber, natural silk fiber, and natural wool fiber that have same fineness, breaking strength and other physical indicators.

The specific properties of the functional modified natural fibers can be shown in Table 3 below. It is noted that, in the testing groups the supercritical carbon dioxide is used in the dyeing and modification process, while in the reference groups ('Ref group' in Table 3) the water is used as a solvent in the dyeing and modification process.

As shown in the testing groups of Table 3, the natural cotton fiber, natural linen fiber, natural silk fiber, and the natural wool fiber containing the wormwood extract can be processed respectively by using the supercritical carbon dioxide. In the reference groups of Table 3, the natural cotton fiber, natural linen fiber, natural silk fiber, and the natural wool fiber containing the wormwood extract can be processed respectively by using the water as the solvent.

Comparing the properties of the modified natural fibers shown in the testing groups and the reference groups of Table 3, it is noted that, the physical properties of the modified natural fibers including the dry breaking strength, the wet breaking strength, and the dry breaking elongation, are proximately same. Further, the antibacterial rates to *Escherichia coli*, *Staphylococcus aureus*, and *Candida albicans* are also close to each other. The color washing fastness of the violet dye of the textile fibers processed by using the supercritical carbon dioxide can be up to level five, while the color washing fastness of the violet dye of the textile fibers processed by using the water as the solvent is only level three.

It is noted that, when the fabric including at least 30% of the textile fibers modified by using the wormwood extract, and less than 70% of Modal fiber, the performance indicators of the fabric can achieve the properties described above.

TABLE 3

| | | Fineness (dtex) | Dry breaking strength (cN/dtex) | Wet breaking strength (cN/dtex) | Elongation (%) | Inhibitory rate (%) | | |
|---|---|---|---|---|---|---|---|---|
| | | | | | | *Escherichia coli* | *Staphylococcus aureus* | *Candida albicans* |
| Natural cotton fiber | Testing group | 1.67 | 2.75 | 2.87 | 7.25 | 95 | 91 | 88 |
| | Ref group | 1.67 | 2.65 | 2.79 | 7.03 | 92 | 94 | 85 |

TABLE 3-continued

|  |  | Fineness (dtex) | Dry breaking strength (cN/dtex) | Wet breaking strength (cN/dtex) | Elongation (%) | Inhibitory rate (%) | | |
|---|---|---|---|---|---|---|---|---|
|  |  |  |  |  |  | *Escherichia coli* | *Staphylococcus aureus* | *Candida albicans* |
| Natural linen fiber | Testing group | 1.67 | 30.5 | 29.6 | 3.2 | 94 | 93 | 87 |
|  | Ref group | 1.67 | 32.3 | 30.9 | 3.1 | 92 | 89 | 90 |
| Natural silk fiber | Testing group | 1.67 | 28.7 | 30.2 | 35 | 90 | 92 | 89 |
|  | Ref group | 1.67 | 27.3 | 29.04 | 32.8 | 92 | 93 | 86 |
| Natural wool fiber | Testing group | 1.67 | 2.83 | 1.91 | 24.1 | 93 | 93 | 87 |
|  | Ref group | 1.67 | 2.76 | 1.89 | 24.4 | 92 | 94 | 86 |

Example 4

The lavender extract and safflower dye are used to dye and modify yarns made by the natural fibers, including natural cotton fiber, natural linen fiber, natural silk fiber, and natural wool fiber that have same fineness, breaking strength and other physical indicators. The dyeing and functional modification process can be referred to Example 1 described above.

The specific properties of the functional modified natural fibers can be shown in Table 4 below. It is noted that, in the testing groups the supercritical carbon dioxide is used in the dyeing and modification process, while in the reference groups ('Ref group' in Table 4) the water is used as a solvent in the dyeing and modification process.

TABLE 4

|  |  | Fineness (dtex) | Dry breaking strength (cN/dtex) | Wet breaking strength (cN/dtex) | Elongation (%) | Inhibitory rate (%) | | |
|---|---|---|---|---|---|---|---|---|
|  |  |  |  |  |  | *Escherichia coli* | *Staphylococcus aureus* | *Candida albicans* |
| Natural cotton fiber | Testing group | 1.67 | 2.75 | 2.87 | 7.25 | 95 | 91 | 88 |
|  | Ref group | 1.67 | 2.65 | 2.79 | 7.03 | 92 | 94 | 85 |
| Natural linen fiber | Testing group | 1.67 | 31.2 | 29.8 | 3.1 | 89 | 92 | 86 |
|  | Ref group | 1.67 | 32.6 | 30.6 | 2.9 | 90 | 92 | 88 |
| Natural silk fiber | Testing group | 1.67 | 28.7 | 30.2 | 35 | 90 | 92 | 89 |
|  | Ref group | 1.67 | 27.3 | 29.04 | 32.8 | 92 | 93 | 86 |
| Natural wool fiber | Testing group | 1.67 | 2.83 | 1.91 | 24.1 | 93 | 93 | 87 |
|  | Ref group | 1.67 | 2.76 | 1.89 | 24.4 | 92 | 94 | 86 |

As shown in the testing groups of Table 4, the natural cotton fiber, natural linen fiber, natural silk fiber, and the natural wool fiber containing the lavender extract can be processed respectively by using the supercritical carbon dioxide. In the reference groups of Table 4, the natural cotton fiber, natural linen fiber, natural silk fiber, and the natural wool fiber containing the lavender extract can be processed respectively by using the water as the solvent.

Comparing the properties of the modified natural fibers shown in the testing groups and the reference groups of Table 4, it is noted that, the physical properties of the modified natural fibers including the dry breaking strength, the wet breaking strength, and the dry breaking elongation, are proximately same. Further, the antibacterial rates to *Escherichia coli*, *Staphylococcus aureus*, and *Candida albicans* are also close to each other. The color washing fastness of the safflower dye of the textile fibers processed by using the supercritical carbon dioxide can be up to level five, while the color washing fastness of the safflower dye of the textile fibers processed by using the water as the solvent is only level three.

Comparing the properties of the natural fibers modified by using different natural plant extracts and/or natural plant dyes as shown in Tables 2-4, the natural fibers modified by using the mint extract and/or the rose dye have a significant improvement to the wet breaking strength as shown in Table 2. The modified natural cotton fiber by using the mint extract and/or the rose dye can have a wet breaking strength as about 3.5 cN/dtex. The modified natural silk fiber by using the mint extract and/or the rose dye can have a wet breaking strength as about 32.2 cN/dtex. The modified natural wool fiber by using the mint extract and/or the rose dye can have a wet breaking strength as about 2.61 cN/dtex. Further, the natural fibers modified by using the mint extract and/or the rose dye have a significant improvement to the antibacterial rates of *Escherichia coli*, *Staphylococcus aureus*, and *Candida albicans*.

It is noted that, when the fabric including at least 30% of the textile fibers modified by using the lavender extract, and less than 70% of the ordinary viscose fiber, Modal fiber, or Tencel fiber, the performance indicators of the fabric can achieve the properties described above.

Example 5

The wormwood extract and the violet dye are used to dye and modify yarns made by the natural fibers, including natural cotton fiber, natural linen fiber, natural silk fiber, and natural wool fiber that have same fineness, breaking strength and other physical indicators. The dyeing and functional modification process can be referred to Example 3 described above.

The specific properties of the functional modified natural fibers can be shown in Table 5 below. It is noted that, in the testing groups the supercritical carbon dioxide is used in the dyeing and modification process, while in the reference groups ('Ref group' in Table 5) the water is used as a solvent in the dyeing and modification process.

As shown in the testing groups of Table 5, the natural cotton fiber, natural linen fiber, natural silk fiber, and the natural wool fiber containing the wormwood extract and the violet dye can be processed respectively by using the supercritical carbon dioxide. In the reference groups of Table 3, the natural cotton fiber, natural linen fiber, natural silk fiber, and the natural wool fiber containing the wormwood extract and the violet dye can be processed respectively by using the water as the solvent.

Comparing the properties of the modified natural fibers shown in the testing groups and the reference groups of Table 5, it is noted that, the physical properties of the modified natural fibers including the dry breaking strength, the wet breaking strength, and the dry breaking elongation, are proximately same. Further, the antibacterial rates to *Escherichia coli, Staphylococcus aureus*, and *Candida albicans* are also close to each other. The color washing fastness of the violet dye of the textile fibers processed by using the supercritical carbon dioxide can be up to level five, while the color washing fastness of the violet dye of the textile fibers processed by using the water as the solvent is only level three.

TABLE 5

| | | Number of yarn unit (s) | Inhibitory rate (%) | | |
|---|---|---|---|---|---|
| | | | *Escherichia coli* | *Staphylococcus aureus* | *Candida albicans* |
| Natural cotton fiber | Testing group | 40 | 95 | 91 | 88 |
| | Ref group | 40 | 92 | 94 | 85 |
| Natural linen fiber | Testing group | 40 | 89 | 92 | 86 |
| | Ref group | 40 | 90 | 92 | 88 |
| Natural silk fiber | Testing group | 40 | 90 | 92 | 89 |
| | Ref group | 40 | 92 | 93 | 86 |
| Natural wool fiber | Testing group | 40 | 93 | 93 | 87 |
| | Ref group | 40 | 92 | 94 | 86 |

It is noted that, when the fabric including at least 30% of the textile fibers modified by using the wormwood extract, and less than 70% of the ordinary viscose fiber, Modal fiber, Tencel fiber, or combinations thereof, the performance indicators of the fabric can achieve the properties described above.

Example 6

The rose dye and/or the mint extract are used to dye and modify the cotton fabric.

About 200 Kg cotton fabric to be dyed or modified can be added into the dyeing and functional modification kettle. About 2 Kg rose dye and/or about 1 Kg mint extract can be added into the mixing kettle. The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa, and the temperature of the liquid carbon dioxide can be heated to about 100° C. to obtain the supercritical carbon dioxide.

The supercritical carbon dioxide can be injected into the mixing kettle. A pressure of the mixing kettle can be increased to about 30 Mpa, and a temperature of the mixing kettle can be increased to about 100° C. The supercritical carbon dioxide can be fully contacted with the rose dye and/or the mint extract and to fully dissolve the rose dye and/or mint extract.

The dyeing and functional modification kettle can be heated and pressurized. A temperature of the dyeing and functional modification kettle can be set to about 100° C. A pressure of the dyeing and functional modification kettle can be set to about 30 MPa. The supercritical carbon dioxide carrying the rose dye and/or the mint extract in the mixing kettle can be injected into the dyeing and functional modification kettle. The supercritical carbon dioxide can be circulated in the dyeing and functional modification kettle to fully mix with the cotton fabric for about a time period.

After the process for dyeing and functional modification to the textile fibers, a post-process can be performed. The supercritical carbon dioxide carrying the rose dye and/or the mint extract can be transferred from the dyeing and functional modification kettle to the separating kettle. A temperature of the separating kettle can be set to about 90° C., and a pressure of the separating kettle can be set to about 2 MPa. The gaseous carbon dioxide can enter a condensing kettle, and the rose dye and/or the mint extract can be left in the separating kettle.

A temperature of the condensing kettle can be set as the room temperature, such as about 20° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified cotton fabric can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the rose dye and/or mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the rose dye and/or mint extract. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the rose dye and/or mint extract. The gaseous carbon dioxide can enter the condenser. The rose dye and/or mint extract can be remained in the separator. Therefore, the rose dye and/or mint extract in the pipelines can be cleaned up.

The specific antibacterial rate of the functional modified cotton fabric can be related to the time period. The effects of the time period for functional modification process on the specific antibacterial rate can be shown in Table 6 below.

TABLE 6

| Time period for functional modification process (minute) | Antibacterial rate (%) | | |
| --- | --- | --- | --- |
| | Escherichia coli | Staphylococcus aureus | Candida albicans |
| 30 | 75 | 72 | 65 |
| 60 | 86 | 78 | 71 |
| 90 | 97 | 98 | 95 |
| 120 | 95 | 93 | 91 |
| 150 | 95 | 94 | 91 |

As shown in Table 6, with the increasing of the time period for functional modification process, the functional modified cotton fabric can have better antibacterial rates to *Escherichia coli, Staphylococcus aureus*, and *Candida albicans*. However, when the time period for functional modification process is more than 90 minutes, the increases of the antibacterial rates are not significant. Therefore, the time period for functional modification process for natural cotton fiber can be about 90 minutes.

According to GB/T3921.3-1997 standard, the color washing fastness of the dyed and modified cotton fabric can be tested. The color washing fastness of the rose dye of the cotton fabric processed by using the supercritical carbon dioxide can be up to level five, while the color washing fastness of the rose dye of the cotton fabric processed by using the water as the solvent is only level three. Further, the mechanical properties of the dyed and modified cotton fabric can be tested. The strength of the cotton fabric processed by using the supercritical carbon dioxide can be decreased by about 10%, while the strength of the cotton fabric processed by using the water as the solvent is decreased by about 40%.

The mint extract includes menthone, menthol and other chemical ingredients that can provide cool senses. The cotton fabric modified by using the mint extract can be tested on the instantly touching cool sensation (Q-max). The value of Q-max can indicate a maximum amount of heat loss on human skin surface when touches the fabric, which is also the maximum heat flow through the fabric. A testing result of Q-max of the cotton fabric is 0.390 W/cm$^2$, which is much higher than the standard indicator of Q-max of 0.14 W/cm$^2$.

Example 7

The safflower dye and wormwood extract are used to dye and modify the cotton garments.

Ten sets of cotton garments to be dyed and modified can be added into the dyeing and functional modification kettle. About 1 Kg of wormwood extract can be added into the natural plant dyes and extracts kettle.

The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa, and the temperature of the liquid carbon dioxide can be heated to about 90° C. to obtain the supercritical carbon dioxide.

About 5 Kg of safflower plant fresh petals and/or dry petals can be added into the natural plant dye extraction kettle. The natural plant dye extraction kettle can be pressured to about 30 Mpa, and be heated to about 90° C. The supercritical carbon dioxide can be injected into the natural plant dye extraction kettle. According to different temperatures and different pressures of the supercritical carbon dioxide, the effective components in the pigments of safflower plant may have different degrees of solubility in the supercritical carbon dioxide. As such, the pigments in the safflower plant petals can be dissolved in the supercritical carbon dioxide, and the safflower dye can be extracted.

The supercritical carbon dioxide can also be injected into the natural plant dyes and extracts kettle. A pressure of the natural plant dyes and extracts kettle can be increased to about 30 Mpa, and a temperature of the natural plant dyes and extracts kettle can be increased to about 90° C. The supercritical carbon dioxide can be fully contacted with the wormwood extract. As such, the wormwood extract can be evenly dispersed and then dissolved in the supercritical carbon dioxide.

The supercritical carbon dioxide carrying the wormwood extract and the supercritical carbon dioxide carrying the safflower dye can pass through one or more filters, and enter the mixing kettle through one or more pipelines, and be mixed together in the mixing kettle. As such, the wormwood extract and the safflower dye can be evenly dispersed and dissolved in the supercritical carbon dioxide.

The dyeing and functional modification kettle can be heated and pressurized. A temperature of the dyeing and functional modification kettle can be set to about 90° C. A pressure of the dyeing and functional modification kettle can be set to about 30 MPa. The supercritical carbon dioxide carrying the wormwood extract and the safflower dye in the mixing kettle can be injected into the dyeing and functional modification kettle. The supercritical carbon dioxide can be circulated in the dyeing and functional modification kettle to fully mix with the cotton garments for a period of time.

After the process for dyeing and functional modification to the cotton garments, a post-process can be performed. The supercritical carbon dioxide carrying the wormwood extract and the safflower dye can be transferred from the dyeing and functional modification kettle to the separating kettle. A temperature of the separating kettle can be set to about 80° C., and a pressure of the separating kettle can be set to about 2 MPa. The gaseous carbon dioxide can enter a condensing kettle, and the wormwood extract and the safflower dye can be left in the separating kettle.

A temperature of the condensing kettle can be set as the room temperature, such as about 20° C. to 25° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified cotton garments can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the safflower dye and the mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the wormwood extract and the safflower dye. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the wormwood extract and the safflower dye. The gaseous carbon dioxide can enter the condenser. The wormwood extract and the safflower dye can be remained in the separator. Therefore, the wormwood extract and the safflower dye in the pipelines can be cleaned up.

The specific antibacterial rate of the functional modified cotton garments can be related to the time period. The effects of the time period for functional modification process on the specific antibacterial rate can be shown in Table 7 below.

TABLE 7

| Time period for functional modification process (minute) | Antibacterial rate (%) | | |
|---|---|---|---|
| | Escherichia coli | Staphylococcus aureus | Candida albicans |
| 30 | 73 | 76 | 70 |
| 60 | 81 | 83 | 79 |
| 90 | 90 | 89 | 86 |
| 120 | 91 | 90 | 90 |
| 150 | 94 | 93 | 92 |
| 180 | 95 | 94 | 93 |
| 210 | 96 | 95 | 93 |

As shown in Table 7, with the increasing of the time period for functional modification process, the functional modified cotton garments can have better antibacterial rates to *Escherichia coli, Staphylococcus aureus*, and *Candida albicans*. However, when the time period for functional modification process is more than 150 minutes, the increases of the antibacterial rates are not significant. Therefore, the time period for functional modification process for natural cotton garments can be about 150 minutes.

According to GB/T3921.3-1997 standard, the color washing fastness of the dyed and modified cotton garments can be tested. The color washing fastness of the safflower dye of the cotton garments processed by using the supercritical carbon dioxide can be up to level five, while the color washing fastness of the safflower dye of the cotton garments processed by using the water as the solvent is only level three. Further, the mechanical properties of the dyed and modified cotton garments can be tested. The strength of the cotton garments processed by using the supercritical carbon dioxide can be decreased by about 10%, while the strength of the cotton garments processed by using the water as the solvent is decreased by about 40%.

Example 8

The rose dye and/or the mint extract are used to dye and modify the polyester fiber.

About 50 Kg polyester fiber to be dyed or modified can be added into the dyeing and functional modification kettle. About 2 Kg rose dye and/or about 1 Kg mint extract can be added into the mixing kettle. The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa, and the temperature of the liquid carbon dioxide can be heated to about 120° C. to obtain the supercritical carbon dioxide.

The supercritical carbon dioxide can be injected into the mixing kettle. A pressure of the mixing kettle can be increased to about 30 Mpa, and a temperature of the mixing kettle can be increased to about 120° C. The supercritical carbon dioxide can be fully contacted with the rose dye and/or the mint extract and to fully dissolve the rose dye and/or mint extract.

The dyeing and functional modification kettle can be heated and pressurized. A temperature of the dyeing and functional modification kettle can be set to about 120° C. A pressure of the dyeing and functional modification kettle can be set to about 30 MPa. The supercritical carbon dioxide carrying the rose dye and/or the mint extract in the mixing kettle can be injected into the dyeing and functional modification kettle. The supercritical carbon dioxide can be circulated in the dyeing and functional modification kettle to fully mix with the polyester fiber for about a time period.

After the process for dyeing and functional modification to the polyester fiber, a post-process can be performed. The supercritical carbon dioxide carrying the rose dye and/or the mint extract can be transferred from the dyeing and functional modification kettle to the separating kettle. A temperature of the separating kettle can be set to about 100° C., and a pressure of the separating kettle can be set to about 2 MPa. The gaseous carbon dioxide can enter a condensing kettle, and the rose dye and/or the mint extract can be left in the separating kettle.

A temperature of the condensing kettle can be set as the room temperature, such as about 20° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified polyester fiber can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the rose dye and/or mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the rose dye and/or mint extract. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the rose dye and/or mint extract. The gaseous carbon dioxide can enter the condenser. The rose dye and/or mint extract can be remained in the separator. Therefore, the rose dye and/or mint extract in the pipelines can be cleaned up.

The specific antibacterial rate of the functional modified polyester fiber can be related to the time period. The effects of the time period for functional modification process on the specific antibacterial rate can be shown in Table 1 below.

TABLE 8

| Time period for functional modification process (minute) | Antibacterial rate (%) | | |
|---|---|---|---|
| | Escherichia coli | Staphylococcus aureus | Candida albicans |
| 30 | 70 | 72 | 69 |
| 60 | 76 | 78 | 78 |
| 90 | 88 | 86 | 89 |
| 120 | 92 | 90 | 92 |
| 150 | 94 | 92 | 96 |
| 180 | 95 | 93 | 97 |

As shown in Table 8, with the increasing of the time period for functional modification process, the functional modified polyester fiber can have better antibacterial rates to *Escherichia coli, Staphylococcus aureus*, and *Candida albicans*. However, when the time period for functional modification process is more than 150 minutes, the increases of the antibacterial rates are not significant. Therefore, the time period for functional modification process for the polyester fiber can be about 150 minutes.

As shown in Table 8, when the rose dye and the mint extract are used to dye and modify the polyester fiber for about 150 minutes, the modified polyester fiber can have an inhibitory rate to *Escherichia coli* about 94%, an inhibition rate to *Staphylococcus aureus* about 92%, an inhibitory rate to *Candida albicans* about 96%.

Example 9

The safflower dye and wormwood extract are used to dye and modify the polyester garments.

Ten sets of polyester garments to be dyed and modified can be added into the dyeing and functional modification kettle. About 1 Kg of wormwood extract can be added into the natural plant dyes and extracts kettle.

The liquid carbon dioxide stored in the carbon dioxide storage tank can be injected into the carbon dioxide high pressure pump. The pressure of the liquid carbon dioxide in the carbon dioxide high pressure pump can be increased to about 30 Mpa, and the temperature of the liquid carbon dioxide can be heated to about 90° C. to obtain the supercritical carbon dioxide.

About 5 Kg of safflower plant fresh petals and/or dry petals can be added into the natural plant dye extraction kettle. The natural plant dye extraction kettle can be pressured to about 30 Mpa, and be heated to about 90° C. The supercritical carbon dioxide can be injected into the natural plant dye extraction kettle. According to different temperatures and different pressures of the supercritical carbon dioxide, the effective components in the pigments of safflower plant may have different degrees of solubility in the supercritical carbon dioxide. As such, the pigments in the safflower plant petals can be dissolved in the supercritical carbon dioxide, and the safflower dye can be extracted.

The supercritical carbon dioxide can also be injected into the natural plant dyes and extracts kettle. A pressure of the natural plant dyes and extracts kettle can be increased to about 30 Mpa, and a temperature of the natural plant dyes and extracts kettle can be increased to about 90° C. The supercritical carbon dioxide can be fully contacted with the wormwood extract. As such, the wormwood extract can be evenly dispersed and then dissolved in the supercritical carbon dioxide.

The supercritical carbon dioxide carrying the wormwood extract and the supercritical carbon dioxide carrying the safflower dye can pass through one or more filters, and enter the mixing kettle through one or more pipelines, and be mixed together in the mixing kettle. As such, the wormwood extract and the safflower dye can be evenly dispersed and dissolved in the supercritical carbon dioxide.

The dyeing and functional modification kettle can be heated and pressurized. A temperature of the dyeing and functional modification kettle can be set to about 90° C. A pressure of the dyeing and functional modification kettle can be set to about 30 MPa. The supercritical carbon dioxide carrying the wormwood extract and the safflower dye in the mixing kettle can be injected into the dyeing and functional modification kettle. The supercritical carbon dioxide can be circulated in the dyeing and functional modification kettle to fully mix with the polyester garments for a period of time.

After the process for dyeing and functional modification to the polyester garments, a post-process can be performed. The supercritical carbon dioxide carrying the wormwood extract and the safflower dye can be transferred from the dyeing and functional modification kettle to the separating kettle. A temperature of the separating kettle can be set to about 80° C., and a pressure of the separating kettle can be set to about 2 MPa. The gaseous carbon dioxide can enter a condensing kettle, and the wormwood extract and the safflower dye can be left in the separating kettle.

A temperature of the condensing kettle can be set as the room temperature, such as about 20° C. to 25° C. The pressure of the condensing kettle can be set as about 4 MPa. The gaseous carbon dioxide can be converted into the liquid carbon dioxide for recycling. The liquid carbon dioxide can then reflux from the condensing kettle into the carbon dioxide storage tank to participate in a next round of dyeing process or functional modification process.

A cleaning process can be performed after the dyed and modified polyester garments can be taken out from the dyeing and functional modification kettle. The liquid carbon dioxide stored in the carbon dioxide storage tank can be injected into the carbon dioxide high pressure pump. The carbon dioxide in the high-pressure pump can be pressurized to about 7.382 MPa. A temperature of the carbon dioxide in the high-pressure pump can be heated to about 65° C. to about 70° C. by one preheater. A solubilizing agent can be added into the dyeing and functional modification kettle to dissolve the safflower dye and the mint extract.

In some embodiments, the solubilizing agent can be a mixture of anhydrous ethanol and ethyl acetate. A mass ratio of anhydrous ethanol and the ethyl acetate in the dissolving agent can be in a range from 1:9 to 5:13. A temperature of the dyeing and functional modification kettle can be heated to about 65° C. to about 70° C. by one preheater. A stirrer in the dyeing and functional modification kettle can be started to stir for about 5 minutes to about 10 minutes.

The stirred fluid can pass through the separator to separate the carbon dioxide from the wormwood extract and the safflower dye. A temperature of the separator can be heated to about 80° C. to about 100° C. by one preheater, and a pressure of the separator can be set to about 2 MPa to about 3 MPa. As such, the liquid carbon dioxide can be converted to gaseous carbon dioxide that is separated from the wormwood extract and the safflower dye. The gaseous carbon dioxide can enter the condenser. The wormwood extract and the safflower dye can be remained in the separator. Therefore, the wormwood extract and the safflower dye in the pipelines can be cleaned up.

The specific antibacterial rate of the functional modified polyester garments can be related to the time period. The effects of the time period for functional modification process on the specific antibacterial rate can be shown in Table 9 below.

As shown in Table 7, with the increasing of the time period for functional modification process, the functional modified polyester garments can have better antibacterial rates to *Escherichia coli, Staphylococcus aureus*, and *Candida albicans*. However, when the time period for functional modification process is more than 150 minutes, the increases of the antibacterial rates are not significant. Therefore, the time period for functional modification process for natural polyester garments can be about 150 minutes.

TABLE 7

| Time period for functional modification process (minute) | Antibacterial rate (%) | | |
|---|---|---|---|
| | *Escherichia coli* | *Staphylococcus aureus* | *Candida albicans* |
| 30 | 73 | 76 | 70 |
| 60 | 81 | 83 | 79 |
| 90 | 90 | 89 | 86 |
| 120 | 91 | 90 | 92 |
| 150 | 94 | 92 | 96 |
| 180 | 95 | 92 | 96 |
| 210 | 95 | 93 | 97 |

According to GB/T3921.3-1997 standard, the color washing fastness of the dyed and modified polyester garments can be tested. The color washing fastness of the safflower dye of the polyester garments processed by using the supercritical carbon dioxide can be up to level five, while the color washing fastness of the safflower dye of the polyester garments processed by using the water as the solvent is only level three. Further, the mechanical properties of the dyed and modified polyester garments can be tested. The strength of the polyester garments processed by using the supercritical carbon dioxide can be decreased by about 10%, while the strength of the polyester garments processed by using the water as the solvent is decreased by about 40%.

Accordingly, methods and apparatuses for processing textile fibers, related kettle automatic operation devices, and related textile fiber products are provided.

In the disclosed methods for processing textile fibers, the textile fibers can be dyed and modified by using supercritical carbon dioxide, without using water or other reagents as a solvent. As such, there is no generation and emissions of waste water and waste byproducts during the entire processing. Therefore, the significant cost for processing solid waste and/or liquid waste can be saved. The disclosed methods for processing textile fibers are eco-friendly and environmental-friendly functional modification processes.

The disclosed methods used for natural fiber dyeing and modification can have a fast and short process. The operations of the kettles during the process can be automatic without any manual operations. And after the dyeing and modification process, the supercritical carbon dioxide can be rapidly gasified, thus there is no need to dry the dyed or functional modified fibers. Thus, the labor intensity can be reduced and the efficiency of the disclosed methods is high. The cost of post-processing can be saved, and the production costs can be reduced.

The raw materials used in the disclosed methods for natural fiber dyeing and modification using supercritical carbon dioxide, including carbon dioxide, natural plant dyes, and natural plant extracts, can be fully recycled for a repeated use. Carbon dioxide is non-toxic, tasteless, and nonflammable. The dyeing and modification process requires no dispersants, stabilizers or buffers. Therefore, the production costs can be decreased, and potential pollution can be reduced. The disclosed methods for processing textile fibers can have good social benefits and can be widely used in the textile industry.

The fabrics, garments, home textiles and other textile products manufactured by the disclosed methods do not go through a bleaching process, therefore have no chemical reagent residue, are highly secure to human skin. Further, the fabrics, garments, home textiles and other textile products manufactured by the disclosed methods can have excellent antibacterial and bacteriostatic properties.

It is noted that, the textile fibers dyed and/or functional modified by using the supercritical carbon dioxide can be used to produce non-woven fabrics. The non-woven fabrics can be used to make underwear, T-shirts, towels, bedding, and other textile products. Further, the one or more natural plant dyes and one or more natural plant extracts can be directly purchased from the market.

The natural fibers processed by the disclosed methods can have uniform colors and excellent color reproducibility. The disclosed methods used for natural fiber dyeing and modification using supercritical carbon dioxide do not damage the natural fibers. The fabric products manufactured by the disclosed methods can have good physical properties, and a color fastness up to five degree.

The natural fibers processed by the disclosed methods can have excellent physical properties. For example, a wet breaking strength of the modified natural cotton fiber can be in a range from about 2.87 cN/dtex to about 3.5 cN/dtex, a wet breaking strength of the modified natural silk fiber can be in a range from about 30.2 cN/dtex to about 32.2 cN/dtex, a wet breaking strength of the modified natural wool fiber can be in a range from about 1.91 cN/dtex to about 2.61 cN/dtex, and a wet breaking strength of the modified polyester fiber can be in a range from about 4.1 cN/dtex to about 5.0 cN/dtex.

The natural fibers processed by the disclosed methods can have excellent antibacterial and bacteriostatic properties.

For example, the modified natural cotton fiber can have an inhibitory rate to *Escherichia coli* in a range from about 93% to about 95%, an inhibition rate to *Staphylococcus aureus* in a range from about 91% to about 95%, an inhibitory rate to *Candida albicans* in a range from about 87% to about 89%. As another example, the modified natural silk fiber can have an inhibitory rate to *Escherichia coli* in a range from about 90% to about 98%, an inhibition rate to *Staphylococcus aureus* in a range from about 92% to about 96%, an inhibitory rate to *Candida albicans* in a range from about 87% to about 88%. As yet another example, the modified natural wool fiber can have an inhibitory rate to *Escherichia coli* in a range from about 93% to about 97%, an inhibition rate to *Staphylococcus aureus* in a range from about 93% to about 95%, an inhibitory rate to *Candida albicans* in a range from about 87% to about 96%. As yet another example, the modified polyester fiber can have an inhibitory rate to *Escherichia coli* in a range from about 91% to about 94%, an inhibition rate to *Staphylococcus aureus* in a range from about 89% to about 92%, an inhibitory rate to *Candida albicans* in a range from about 87% to about 96%.

The fibers processed by the disclosed methods and apparatus, by supercritical fluid extraction and dyeing, may be modified by various other natural materials, thereby providing other improved properties, e.g., to fabric, textile, and/or clothes thereof. For example, the functionally modified the textile fibers include violet dye and/or the wormwood extract modified textile fibers, having a color washing fastness improved from level three, for the non-modified fibers thereof, to level five. In another example, the functionally modified the textile fibers include mint extract modified textile fibers, having an instantly touching cool sensation (Q-max) of about 0.390 W/cm$^2$, while non-modified fibers thereof have the Q-max of about 0.140 W/cm$^2$. In yet other examples, a fabric, made by grass coral extract modified textile fibers, has an increased moisture absorption and heating temperature by 8° C. increased based on the non-modified fibers thereof; and a fabric, made by apocynum modified textile fibers, provides a far infrared function with a phase emissivity of a normal phase up to about 89%. Such fabric may be used to make clothes for infant and/or children.

The provision of the examples described herein (as well as clauses phrased as "such as," "e.g.," "including," or the like) should not be interpreted as limiting the disclosure to the specific examples; rather, the examples are intended to illustrate only some of many possible aspects.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure. Features of the disclosed embodiments can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

What is claimed is:

1. A method for processing textile fibers, comprising:
    adding a plurality of raw materials for processing textile fibers into a plurality of kettles;
    preparing supercritical carbon dioxide;
    independently obtaining one or more natural plant dyes and one or more natural plant extracts from the plurality of raw materials, and dissolving the one or more natural plant dyes and the one or more natural plant extracts in the supercritical carbon dioxide in different kettles of the plurality of kettles;
    mixing, in a mixing kettle, supercritical carbon dioxide carrying the one or more natural plant dyes and carbon dioxide carrying the one or more natural plant extracts to form supercritical carbon dioxide carrying an evenly dispersed mixture of the one or more natural plant dyes and the one or more natural plant extracts;
    dyeing and functionally modifying the textile fibers simultaneously in a single dyeing and functional modification kettle by using the supercritical carbon dioxide carrying the evenly dispersed mixture of the one or more natural plant dyes for dyeing the textile fibers and the one or more natural plant extracts for functionally modifying the textile fibers,
        wherein the one or more natural plant extracts include mint extract, and the one or more natural plant dyes include rose dye, and the textile fibers include natural cotton fiber and polyester fiber,
        when the natural cotton fiber of about 50 Kg is dyed and modified by the rose dye of about 2 Kg and the mint extract of about 1 Kg for about 120 minutes to about 180 minutes, the modified natural cotton fiber has an inhibitory rate to *Escherichia coli* in a range from about 93% to about 95%, an inhibition rate to *Staphylococcus aureus* in a range from about 94% to about 95%, an inhibitory rate to *Candida albicans* in a range from about 87% to about 89%, and
        when the polyester fiber of about 50 Kg is dyed and modified by the rose dye of about 2 Kg and the mint extract of about 1 Kg for about 120-180 mins, the modified natural cotton fiber has an inhibitory rate to *Escherichia coli* in a range from about 92% to about 95%, an inhibition rate to *Staphylococcus aureus* in a range from about 90% to about 93%, an inhibitory rate to *Candida albicans* in a range from about 92% to about 97%;
    performing a post-process to recycle the supercritical carbon dioxide; and
    performing a cleaning process to clean the one or more natural plant dyes and one or more natural plant extracts.

2. The method of claim 1, wherein adding the plurality of raw materials for processing textile fibers into the plurality of kettles includes:
    automatically opening, using a kettle automatic operation device, kettle covers of a natural plant dye extraction kettle, a natural plant dyes and extracts kettle, and the dyeing and functional modification kettle;
    adding textile fibers to be dyed and functionally modified into the dyeing and functional modification kettle;
    adding one or more natural plant extracts into the natural plant dyes and extracts kettle;
    adding one or more natural plants into the natural plant dye extraction kettle; and
    automatically closing, using the kettle automatic operation device, the kettle covers of the plant dye extraction kettle, the natural plant dyes and extracts kettle, and the dyeing and functional modification kettle.

3. The method of claim 1, wherein adding the plurality of raw materials for processing textile fibers into the plurality of kettles includes:
    automatically opening, using a kettle automatic operation device, kettle covers of a natural plant dye extraction kettle, a natural plant dyes and extracts kettle, and a dyeing and functional modification kettle;

adding textile fibers to be dyed and functionally modified into the dyeing and functional modification kettle;

adding one or more natural plant extracts and one or more natural plant dyes into the natural plant dyes and extracts kettle; and automatically closing, using the kettle automatic operation device, the kettle covers of the plant dye extraction kettle, the natural plant dyes and extracts kettle, and the dyeing and functional modification kettle.

4. The method of claim 1, wherein preparing supercritical carbon dioxide includes:

injecting the liquid carbon dioxide stored in a carbon dioxide storage tank into a carbon dioxide high pressure pump;

increasing the pressure of the liquid carbon dioxide in the carbon dioxide high pressure pump to about 30 Mpa 32 MPa; and heating the liquid carbon dioxide in the carbon dioxide high pressure pump to about 90° C. 120° C.

5. The method of claim 2, wherein obtaining one or more natural plant dyes and one or more natural plant extracts from the plurality of raw materials and dissolving the one or more natural plant dyes and the one or more natural plant extracts in the supercritical carbon dioxide includes:

extracting one or more natural plant dyes of the one or more natural plants in the natural plant dye extraction kettle;

dissolving the one or more natural plant extract in the supercritical carbon dioxide respectively in the natural plant dye extraction kettle; and dissolving the one or more natural plant dyes in the supercritical carbon dioxide respectively in the natural plant dyes and extracts kettle.

6. The method of claim 1, wherein the post-process includes:

separating the supercritical carbon dioxide from the one or more natural plant dyes and the one or more natural plant extracts by converting the supercritical carbon dioxide into gaseous carbon dioxide; and converting the gaseous carbon dioxide into liquid carbon dioxide.

7. The method of claim 1, wherein the cleaning process includes:

injecting the liquid carbon dioxide from a carbon dioxide storage tank into a carbon dioxide high pressure pump;

increasing a pressure and a temperature of the liquid carbon dioxide in the high-pressure pump;

adding a solubilizing agent into a dyeing and functional modification kettle to dissolve the one or more natural plant dyes and the one or more natural plant extracts; and separating the liquid carbon dioxide from the one or more natural plant dyes and the one or more natural plant extracts.

8. The method of claim 1, wherein:

the textile fibers further include at least one of natural linen fiber, natural silk fiber, and natural wool fiber;

the one or more natural plant extracts further include at least one of wormwood extract, and grass coral extract; and the one or more natural plant dyes further include at least one of rose violet dye, safflower dye, and *perilla* dye.

9. The method of claim 2, wherein:

a mass ratio of the textile fibers and the one or more natural plants is in a range from about 20:1 to about 10:1; and a mass ratio of the textile fibers and the one or more natural plant extracts is in a range from about 20:1 to about 10:1.

10. The method of claim 3, wherein:

a mass ratio of the textile fibers and the one or more natural plant dyes is in a range from about 50:1 to about 20:1; and a mass ratio of the textile fibers and the one or more natural plant extracts is in a range from about 20:1 to about 10:1.

* * * * *